US012688364B2

(12) United States Patent
Rhatigan

(10) Patent No.: US 12,688,364 B2
(45) Date of Patent: Jul. 21, 2026

(54) SYSTEMS AND METHODS FOR AUTOMATED DATA PROCUREMENT

(71) Applicant: REVIUM IRELAND LIMITED, Dublin (IE)

(72) Inventor: Patrick Rhatigan, New York, NY (US)

(73) Assignee: REVIUM IRELAND LIMITED, Dublin (IE)

( * ) Notice: Subject to any disclaimer, the term of this patent is extended or adjusted under 35 U.S.C. 154(b) by 134 days.

(21) Appl. No.: 18/797,639

(22) Filed: Aug. 8, 2024

(65) Prior Publication Data

US 2025/0036877 A1 Jan. 30, 2025

Related U.S. Application Data

(63) Continuation of application No. PCT/US2023/013110, filed on Feb. 15, 2023.
(Continued)

(51) Int. Cl.
| | |
|---|---|
| *G06F 40/00* | (2020.01) |
| *G06F 40/289* | (2020.01) |
| *G06N 20/00* | (2019.01) |

(52) U.S. Cl.
CPC ........... *G06F 40/289* (2020.01); *G06N 20/00* (2019.01)

(58) Field of Classification Search
CPC ...... G06F 40/289; G06F 40/253; G06F 40/35; G06F 40/56; G06F 40/30; G06F 40/274; G06N 3/0475; G06N 20/00; G06N 3/0455; G06N 3/0464; G06N 3/044; G06N 3/08; G06V 30/10; G06V 10/82; G06Q 10/10
See application file for complete search history.

(56) References Cited

U.S. PATENT DOCUMENTS

| 11,045,271 B1 * | 6/2021 | Tran | A61B 34/70 |
|---|---|---|---|
| 11,481,425 B2 * | 10/2022 | Wang | G06N 20/00 |
(Continued)

FOREIGN PATENT DOCUMENTS

WO WO-2023158676 A1 8/2023

OTHER PUBLICATIONS

N. Gamal, S. Ghoniemy, H. M. Faheem and N. A. Seada, "Sentiment-Based Spatiotemporal Prediction Framework for Pandemic Outbreaks Awareness Using Social Networks Data Classification," in IEEE Access, vol. 10, pp. 76434-76469, 2022. (Year: 2022).*
(Continued)

*Primary Examiner* — Edgar X Guerra-Erazo
(74) *Attorney, Agent, or Firm* — Wilson Sonsini Goodrich & Rosati

(57) ABSTRACT

The present disclosure provides a system for generating customized messages to a prospect. The system comprises: a data input module configured to receive prospect data, wherein the prospect data comprises data related to a prospect and data gathered from a plurality of sources; an input data processing module configured to select a subset of the data to create an input data; a first model trained to generate one or more sentences based on the input data; and a second model trained to determine whether the one or more sentences are unacceptable, wherein upon determining the one or more sentences are unacceptable, directing the input data processing module to select another subset of the data to create a new input data.

15 Claims, 18 Drawing Sheets

Related U.S. Application Data

(60) Provisional application No. 63/310,633, filed on Feb. 16, 2022.

(56) References Cited

U.S. PATENT DOCUMENTS

| | | | | |
|---|---|---|---|---|
| 11,748,555 | B2 * | 9/2023 | Tran ....................... | G06N 20/00 |
| | | | | 715/202 |
| 12,299,385 | B2 * | 5/2025 | Tran .................... | G06N 3/0455 |
| 2009/0037355 | A1 | 2/2009 | Brave et al. | |
| 2011/0276507 | A1 | 11/2011 | O'Malley | |
| 2014/0187213 | A1 | 7/2014 | Shuster et al. | |
| 2014/0358810 | A1 | 12/2014 | Hardtke et al. | |
| 2018/0144761 | A1 | 5/2018 | Amini et al. | |
| 2020/0034432 | A1 * | 1/2020 | Jain ....................... | G06N 3/0475 |
| 2022/0045975 | A1 * | 2/2022 | Flöther .................... | G06N 3/09 |
| 2022/0237368 | A1 * | 7/2022 | Tran ........................ | G06F 21/32 |
| 2022/0269713 | A1 * | 8/2022 | Wang ....................... | G06N 3/09 |
| 2023/0351102 | A1 * | 11/2023 | Tran .................... | G06N 3/0895 |

OTHER PUBLICATIONS

PCT/US2023/013110 International Preliminary Report on Patentability dated Aug. 29, 2024.
PCT/US2023/013110 International Search Report and Written Opinion dated May 16, 2023.

* cited by examiner

SYSTEMS AND METHODS FOR AUTOMATED DATA PROCUREMENT

CROSS-REFERENCE TO RELATED APPLICATIONS

This application is a continuation of International Application PCT/US23/13110 filed Feb. 15, 2023, which application claims the priority and benefit of U.S. Provisional Application No. 63/310,633, filed on Feb. 16, 2022, the entirety of which is incorporated herein by reference.

BACKGROUND

Generating and maintaining a network of professionals is important for business. However, business networking can be hard and time consuming. For example, it can be time consuming, or less efficient to contact people for establishing connections, and it can be a painstaking process to decide who to reach out to and what to talk to engage a prospect in a conversation for a particular purpose. Current platforms, social media software or methods may allow people to establish network connections, initiate conversations, schedule meetings, or perform other interactions. However, such functionalities are provided without automated customization capability. For instance, personalization or customizing messages for engaging a prospect, determining appropriate topics for conversations can still be an expensive, tedious or time-consuming process.

SUMMARY

A need exists for a system or method that can facilitate and automate the process for identifying a prospective/target individual, generating personalized messages and providing streamlined data procurement. The present disclosure provides a platform addressing the above needs with automated customization systems and methods thereby improving the communication or networking performance with various prospective entities. In some embodiments, systems of the present disclosure may utilize machine learning techniques and comprise an assortment of data gathering, entity-based rules, machine learning algorithm trained models connected by sockets for various sources prospect data gathering, analysis and generation.

Systems herein may gather prospect data to automatically identify decision makers for a given purpose and engage them with highly curated individualized messaging. For instance, systems and methods herein may facilitate customized interactions between a user and a prospect/target entity and may automate the process of producing personalized conversation topics, identifying source material and generating personalized messages.

Systems and methods herein can be utilized in a wide range of applications. For instance, systems and methods herein can be utilized for establishing connections, facilitating communication or interactions between individuals for various purposes (e.g., recruitment, reaching out to prospective clients, business development, etc.). In particular, systems and methods herein may be capable of identifying a perspective or target entity (e.g., prospective client, co-worker, prospective collaborator, teammate, colleague, prospective employer, prospective employee, prospective recruiter, etc.), identifying source of information or material that can be utilized to create an opener message, initiating an opener message for a selected purpose, and automatically creating personalized message to the prospect or target entity. For example, systems and methods herein may be implemented as sales enablement tool which automates and organizes the process and provides a pipeline from identifying a prospect for a given purpose, initiating networking conversations with the prospective clients or co-workers up to scheduling a meeting (e.g., phone call or in person meeting). In some cases, once a meeting is scheduled, the system may further generate a comprehensive blueprint on how to close the prospect such as a meeting agenda, topics and optimal channels to follow up a meeting and the like.

The system integrates with a plurality of user services such as social media, email, calendar and the like. The backend of the system provides an adaptive integration interface such that new services can be integrated in a uniform way. Systems and methods herein may comprise a data input module or data gathering module to collect, gather and process various types of prospect data. The term "prospect data" as utilized herein, may generally refer to the data about a prospective or target entity (e.g., prospective client, co-worker, prospective collaborator, teammate, colleague, prospective employer/employee/recruiter, etc.) to whom a user seeks to establish a connection for a given purpose. For instance, prospect data may be related to information about a prospect including, for example, identity information, email address, social media profile and current employment information which may be accessed by the system. In some cases, the prospect data may further include insight data extracted by the system such as personality traits/types, personality tags and the like which may be used to further personalize the message or meeting schedule. The system herein may also allow users to upload data and/or provide user input to trigger the system to gather and assemble the available prospect data from a variety of sources such as a company website, news article APIs, publicly available social media data and various other sources. In some cases, the system may comprise sockets to connect to the variety of sources which provide a programming construct, an instance, or instantiate, that can make use of suitable protocol to send and receive data.

The prospect data may be utilized as input to a trained model for producing a customized or personalized message or sentence(s), and/or a subsequent interactive event (e.g., schedule a meeting) with the prospect. For example, the prospect data may be processed using programing logic and/or machine learning models and fed into a trained generative model. The generative model may utilize the input prospect data (e.g., text data) and generate one or more output sentences customized for the prospect aimed at outreach. In some cases, the prospect data may be further utilized to create training data to train, update or continually train a model.

The provided system may comprise a plurality of machine learning algorithm trained models and/or functional modules (e.g., data input module, user interface module, meeting schedule module, etc.) which are connected by sockets to form an integrated platform. This beneficially enables cloud independence and seamless integration of any new artificial intelligence (AI) techniques (e.g., generative models). In some cases, training datasets have been gathered, generated and developed which have been utilized across various cloud platforms and technology stacks to train a plurality of models which are utilized throughout the process.

In an aspect, the present disclosure provides a system for generating customized messaging. The system comprises: a data input module configured to receive prospect data, wherein the prospect data comprises data related to a prospect and data gathered from a plurality of sources; an input data processing module configured to select a subset of the data to create an input data; a first model trained to generate one or more sentences based on the input data; and a second model trained to process a response from the prospect in response to a message comprising the one or more sentences and generate an automated response handling messaging, based at least in part on availability information obtained from one or more sources referencing availability, and/or marketing material thereby automating one or more follow-up activities.

In an aspect, a system is provided for generating customized opener sentences. The system comprises: a data input module configured to receive prospect data, the prospect data comprises data related to a prospect and data obtained from a plurality of sources; an input data processing module configured to select a first subset of the prospect data to create an input data; a first model trained to generate one or more opener sentences based on the input data; and a second model trained to determine whether the one or more opener sentences are unacceptable. Upon determining the one or more opener sentences are unacceptable, directing the input data processing module to select a second subset of the prospect data to create a new input data.

In some embodiments, the data related to the prospect is received via a graphical user interface (GUI) of the system. In some cases, the plurality of sources is determined based at least in part on the data received via the GUI.

In some embodiments, another subset of the prospect data is selected until the one or more opener sentences are acceptable. In some embodiments, the input data processing module comprises a text selection model trained to select the first subset of the prospect data and the second subset of the prospect data. In some cases, the text selection model is trained by fine-tuning a pre-trained transformer model using a user feedback data. In some instances, the user feedback data comprises a user input indicative a rejection of an opener sentence among the one or more opener sentences or an edit to an opener sentence among the one or more opener sentences.

In some embodiments, the first model or the second model is trained by fine-tuning a pre-trained transformer model using private data. In some cases, the private data comprises user feedback data received in response to the one or more opener sentences and human curated sentences.

In some embodiments, the first subset of the prospect data and the second subset of the prospect data are from different sources from the plurality of sources. In some cases, when the second subset of the prospect data is selected, a processing path corresponding to the source of the second subset of the prospect data is selected for generating one or more new opener sentences. In some instances, the processing path corresponding to the source of the first subset of the prospect data and the processing path corresponding to the source of the second subset of the prospect data are different in at least a pre-determined rule for generating the one or more opener sentences.

In some embodiments, the system further comprises a third model trained to process a response received from the prospect in response to a message comprising the one or more opener sentences and generate an analysis result. In some cases, the analysis result comprises extracted meeting information or personality tag of the prospect. In some instances, the analysis result is used to generate a response handling messaging comprising a meeting time, wherein the meeting time is determined based at least in part on availability information obtained from one or more sources referencing availability of a user and the personality tag of the prospect.

In a related yet separate aspect, a computer-implemented method for generating customized opener sentences comprising: (a) receiving prospect data comprising data related to a prospect and data obtained from a plurality of sources; (b) selecting a first subset of the prospect data to create an input data; (c) generating one or more opener sentences using a first model based on the input data; and (d) determining whether the one or more opener sentences are unacceptable using a second model upon determining the one or more opener sentences are unacceptable, selecting a second subset of the prospect data to create a new input data.

In some embodiments, the data related to the prospect is received via a graphical user interface (GUI). In some cases, the plurality of sources is determined based at least in part on the data received via the GUI.

In some embodiments, the method further comprises repeating (b)-(d) until the one or more opener sentences are acceptable. In some embodiments, the first subset of the prospect data and the second subset of the prospect data are selected using a text selection model. In some cases, the text selection model is trained by fine-tuning a pre-trained transformer model using a user feedback data. In some instances, the user feedback data comprises a user input indicative a rejection of an opener sentence among the one or more opener sentences or an edit to an opener sentence among the one or more opener sentences.

In some embodiments, the first model or the second model is developed by fine-tuning a pre-trained transformer model using private data. In some cases, the private data comprises user feedback data received in response to the one or more opener sentences and human curated sentences.

In some embodiments, the first subset of the prospect data and the second subset of the prospect data are from different sources from the plurality of sources. In some cases, when the second subset of the prospect data is selected, a processing path corresponding to the source of the second subset of the prospect data is selected for generating one or more new opener sentences. In some instances, the processing path corresponding to the source of the first subset of the prospect data and the processing path corresponding to the source of the second subset of the prospect data are different in at least a pre-determined rule for generating the one or more opener sentences.

In some embodiments, the method further comprises processing a response received from the prospect in response to a message comprising the one or more opener sentences and generating an analysis result. In some cases, the analysis result comprises extracted meeting information or personality tag of the prospect. In some embodiments, the method further comprises generating a response handling messaging based at least in part on the analysis result, wherein the response handling messaging comprises a meeting time, and where the meeting time is determined based at least in part on availability information obtained from one or more sources referencing availability of a user and the personality tag of the prospect.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
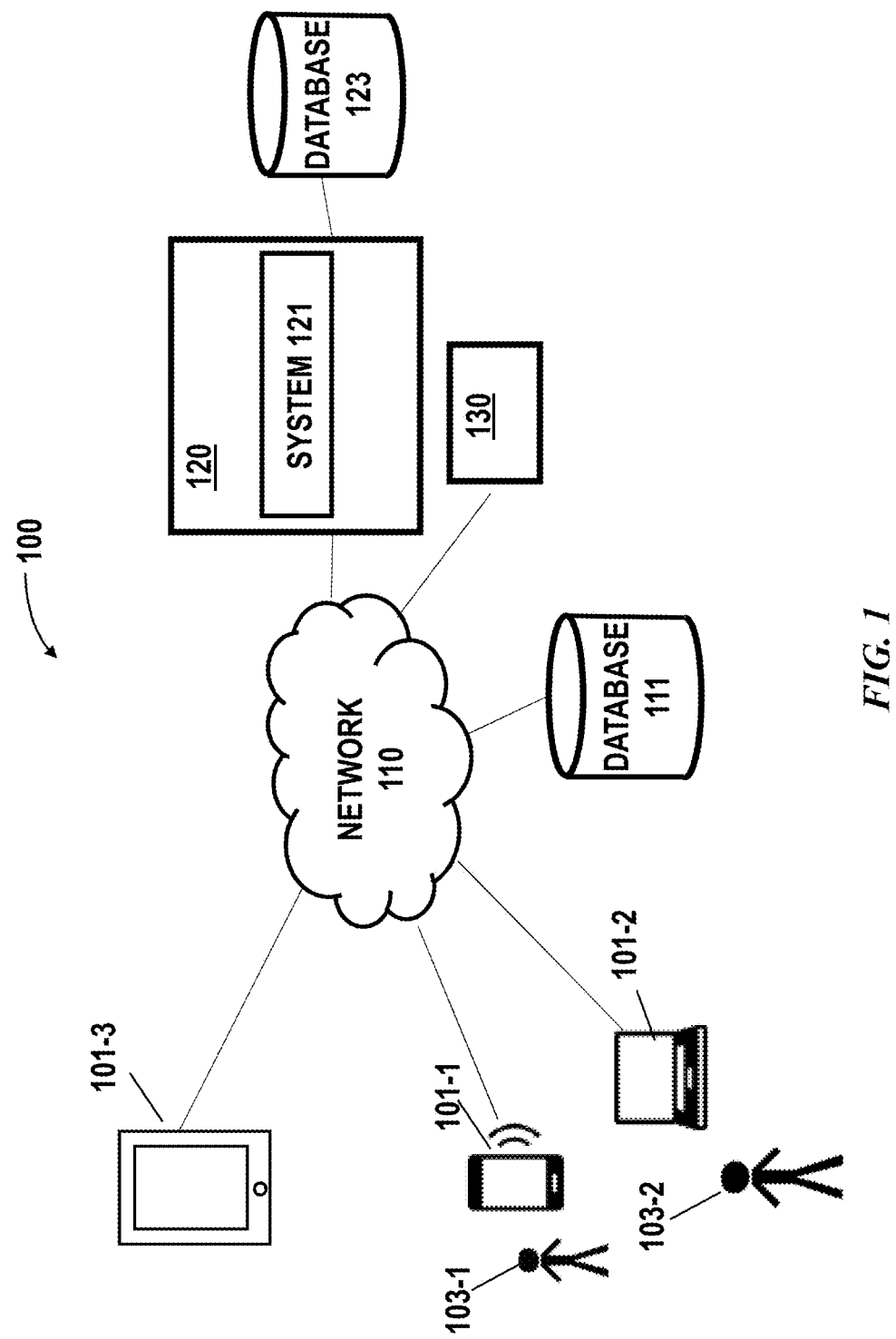
FIG. 1 schematically shows a platform in which the method and system herein can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides a platform integrating a plurality of machine learning-enabled components to facilitate customized interactions between a user and a prospect or target entity. Systems and methods herein may be capable of automating the process of producing personalized conversation topics, identifying source material and generating personalized messages. Systems and methods herein can be utilized in a wide range of applications. For instance, systems and methods herein can be utilized for establishing connections, facilitating communication or interactions between individuals for various purposes. Systems herein may gather prospect data to automatically identify decision makers for a given purpose and engage them with highly curated individualized messaging. In particular, systems and methods herein may be capable of identifying a perspective/target entity (e.g., prospective client, co-worker, prospective collaborator, teammate, colleague, prospective employer/employee/recruiter, etc.), initiating an opener message for a given purpose, and automatically creating personalized message to the prospect or target entity. For example, systems and methods herein may be implemented as sales enablement tool which automates and organizes the process and provides a pipeline from identifying a prospect for a given purpose, initiating networking conversations with the prospective clients or co-workers up to scheduling a meeting (e.g., phone call or in person meeting). In some cases, once a meeting is scheduled, the system may further generate a comprehensive blueprint on how to close the prospect such as a meeting agenda, topics and the like.

Systems and methods herein may comprise a data input module or data gathering module to collect, gather and process various types of prospect data. The term "prospect data" as utilized herein, may generally refer to the data about a prospective or target entity (e.g., prospective client, co-worker, prospective collaborator, teammate, colleague, prospective employer/employee/recruiter, etc.) to whom a user seeks to establish a connection for a given purpose. For instance, prospect data may be related to information about a prospect including, for example, identity information, email address, social media profile and current employment information which may be accessed by the system. In some cases, the prospect data may further include insight data extracted by the system such as personality traits/types, personality tags and the like which may be used to further personalize the message or meeting schedule. The system herein may also allow users to upload data and/or provide user input to trigger the system to gather and assemble the available prospect data from a variety of sources such as a company website, news article APIs, publicly available social media data and various other sources. In some cases, the system may comprise sockets to connect to the variety of sources which provide a programming construct, an instance, or instantiate, that can make use of suitable protocol to send and receive data.

The prospect data may be utilized as input to a trained model for producing a customized or personalized message or sentence(s), and/or a subsequent interactive event (e.g., schedule a meeting) with the prospect. For example, the prospect data may be processed using programing logic and/or machine learning models and fed into a trained generative model. The generative model may utilize the input prospect data (e.g., text data) and generate one or more output sentences customized for the prospect aimed at outreach. In some cases, the prospect data may be further utilized to create training data to train, update or continually train a model.

The provided system may comprise a plurality of machine learning algorithm trained models and/or functional modules (e.g., data input module, user interface module, meeting schedule module, etc.) which are connected by sockets to form an integrated platform. This beneficially enables cloud independence and seamless integration of any new AI techniques (e.g., generative models).

In some embodiments, the machine learning components may comprise transformer-based models, sequence to sequence and encoder-based models for processing the prospect data and produce highly customized message or sentences for a given purpose (e.g., engage prospective client, customer, employer, etc.). In some cases, training datasets have been gathered, generated and developed which have been utilized across various cloud platforms and technology stacks to train a plurality of models which are utilized throughout the process.

The system herein may be "low-code" where the amount of the training dataset used to train the generative and categorical transformer-based models and the production codebase may be reduced. In some cases, the codebase may comprise python code to accommodate the model training and JavaScript for a web interface.

The platform or system herein may comprise a plurality of artificial intelligence (AI) engines including one or more trained models to process a variety types of prospect data to identify a prospect for a given purpose, extract insight about the prospect such as predicting personality tags or personality traits/types based on the prospect data, produce customized textual outputs such as messages/sentences for achieving a given purpose with the target/prospect by leveraging the knowledge/insights extracted from the prospect data.

Additionally, the AI engine of the system may be capable of accurately predicting what the prospect will engage with in the future based on insights extracted from the prospect data (e.g., personality types, tags, etc.). The prediction may be used to automate a pipeline of creating opener message, planning meetings (e.g., topics, appropriate channel, etc.), scheduling follow-up activities and determining appropriate manner to follow up (e.g., channel, frequency, timing, etc.). The provided systems and methods may allow for a range of use cases in industries such as recruiting, social networking, online shopping, e-commerce, content creation (e.g., email, advertisement, report, brochures, digital magazines, product guides, sales playbooks, sales proposals, whitepapers, newsletters, company handbooks, annual reports, etc.), restaurants and dining, tourism and entertainment, healthcare, service delivery, and various others.

A user of the provided system may be an individual (e.g., job applicant, marketing managers, eCommerce team, content managers, sales people, recruiters, marketers, website designer, etc.), an entity (e.g., merchant, retailor, business, company, organization, etc.), or a group of individuals who seek to interact with a target entity/prospect with highly customized/personalized message (e.g., electronic mail (Email), text message, social media, meeting blueprint, communication topic, etc.) or content (e.g., images, blogs, text, etc.). The personalizing or customization features provided herein may require minimal or reduced user input.

The platform or system herein can provide various features for customizing an initial opener message or content. The opener message or content may be customized and suitable for delivery in a selected communication channel such as via electronic mail (Email). For instance, the platform may provide features allowing for fast and simple connection to Email service provider (ESP) platforms, generating emails or newsletters personalized to a prospect thereby engaging the prospect. The platform may generate personalized content and messages delivered or presented to a prospect via a variety of communication channels such as email, social media, online applications thereby increasing the conversion rate, engagement rate or response rate.

The provided systems may employ artificial intelligence techniques to generate or enrich a personalized message/content targeting a prospect, predict personality traits of the prospect, analyze the prospect data to extract the intelligence and insight, schedule meetings or streamline a pipeline of interactions to close a prospect and the like. Artificial intelligence, including machine learning algorithms, may be used to train a predictive model for predicting a recommendation (e.g., catalog, content, message, user intent, user interest, etc.), extracting the usage analytics, performance analytics, impact analytics as described above, and various other functionalities as described elsewhere herein. A machine learning algorithm may be a neural network, for example. Examples of neural networks include a deep neural network, a convolutional neural network (CNN), and a recurrent neural network (RNN). The machine learning algorithm may comprise one or more of the following: a support vector machine (SVM), a naïve Bayes classification, a linear regression model, a quantile regression model, a logistic regression model, a random forest, a neural network, CNN, RNN, a gradient-boosted classifier or repressor, or another supervised or unsupervised machine learning algorithm (e.g., generative adversarial network (GAN), Cycle-GAN, etc.). In some cases, a machine learning algorithm trained model may be pre-trained and implemented on the provided system, and the pre-trained model may undergo continual training that may involve continual tuning of the predictive model or a component of the predictive model (e.g., classifier) to adapt to changes in the implementation environment or use application over time (e.g., changes in the user data, insight data, model performance, third-party data, etc.).

The term "labeled data" or "labeled dataset," as used herein, generally refers to a paired dataset used for training a model using supervised learning or semi-supervised learning. The labeled data may be generated by expert users or using auto-labeling techniques. Alternatively, methods provided herein may utilize an un-paired training approach allowing a machine learning method to train and apply on existing datasets that may be available with an existing system. In some cases, the training method may include semi-supervised learning or unsupervised learning. For instance, the model may be a transformer model or generative model. In some cases, the training method may involve pre-training one or more components of the predictive model, an adaptation stage that involves training the model using custom datasets to adapt to a user, and/or an optimization stage that involves further continual tuning of the model or a component of the model (e.g., classifier) to adapt to changes in the implementation environment or use cases over time (e.g., changes in the model performance, user/prospect-specific data, etc.). Details about the training method and model architectures are described later herein.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit," "module" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 schematically shows a platform 100 in which the method and system herein can be implemented. A platform 100 may include one or more user devices 101-1, 101-2, 101-3, a server 120, a system 121, one or more third-party systems 130, and a database 111, 123. Each of the components 101-1, 101-2, 101-3, 111, 120, 121, 123, 130 may be operatively connected to one another via a network 110 or any type of communication link that allows transmission of data from one component to another.

The system 121 may be configured to permit users (e.g., job applicant, co-worker, merchant, sales manager, content creators, analyzers, administrators, etc.) who seek to initiate or establish connection with a prospect or target entity via customized messages and interactions. The system 121 may include a plurality of functional components such as AI engine, content generation engine, sentence generation engine, scheduling engine, content rating model, personality analysis engine, user interface module, model creation and management system, and/or various others described elsewhere herein. Details about the various functional components are described later herein.

In some cases, the system 121 may be configured to train and develop a plurality of predictive models (e.g., RNN, CNN, GAN, classifiers, etc.) consistent with the methods and functions described herein. The system 121 may be configured to perform one or more operations and provide one or more features consistent with those disclosed with respect to FIGS. 2-15. For example, the system 121 may comprise generative models trained to generate customized messages which appear to be human. The system 121 may further comprise binary and multi-category classification models which may serve as filters and data parsers to filter out unwanted content collected or generated by the system, to enrich the user experience and customize content. In some embodiments, the generative models and/or the classification models may be transformer-based models which may be fine-tuned by custom or private datasets. The datasets may be generated manually such as by manual labelling, by the system then curated by the system admins. Alternatively, the training datasets may be generated automatically or semi-automatically by a labeling system. In some cases, custom datasets may be utilized to fine-tune a preliminary model (e.g., pretrained model). In some cases, insights extracted from the dataset or newly collected user input data may be used to further retrain or update a predictive model. Details about developing a personalized transformer model are described later herein.

The system 121 may be implemented anywhere within the platform, and/or outside of the platform 100. In some embodiments, system 121 may be implemented on server 120. In other embodiments, a portion of the system 121 may be implemented on the user device. Additionally, a portion of system 121 may be implemented on the third-party system 130. Alternatively or in addition to, a portion of the system 121 may be implemented in one or more databases 111, 123. The system 121 may be implemented using software, hardware, or a combination of software and hardware in one or more of the above-mentioned components within the platform. Details about the plurality of the components of the system 121 are described later herein.

In some embodiments, a user 103-1, 103-2 may be associated with one or more user devices 101-1, 101-2, 101-3. User device 101-1, 101-2, 101-3 may be a computing device configured to perform one or more operations consistent with the disclosed embodiments. Examples of user devices may include, but are not limited to, laptop or notebook computers, desktop computers, mobile devices, smartphones/cell phones, wearable device (e.g., smartwatches), tablets, personal digital assistants (PDAs), media content players, television sets, video gaming station/system, virtual reality systems, augmented reality systems, microphones, or any electronic device capable of analyzing, receiving (e.g., receiving user input indicating accept, reject or select a model generated sentence, user input for prospect data, user input for modifying ruleset, etc.), providing or displaying certain types of data (e.g., rendering of a GUI displaying customized email, sentences, etc.) to a user. The user device may be portable. In some cases, the user device may be located remotely from a human user, and the user can control the user device using wireless and/or wired communications. The user device can be any electronic device with a display.

User device 101-1, 101-2, 101-3 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications that allow the user to reach out to a prospect with the customized opener message, schedule a meeting or participate a video meeting via the software application (e.g., Email application, meeting application provided by third-party server 130), and/or software applications provided by the system 121 that allow the user device to communicate with and transfer data between server 120, the system 121, and/or database 111.

The user device 101-1, 101-2, 101-3 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User devices 101-1, 101-2, 101-3 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may display, for example, a user portal with various features such as prospect data upload/input field, preview of sentence(s)/message, and the like. The user device may also be configured to display webpages and/or websites on the Internet. One or more of the web pages/websites may be hosted by server 120, the third-party system 130 and/or rendered by the system 121.

In some cases, users may utilize the user devices to interact with the system 121 by way of one or more software applications (i.e., client software) running on and/or accessed by the user devices, wherein the user devices and the system 121 may form a client-server relationship. For example, the user devices may run dedicated mobile applications or software applications for accessing the client portal provided by the system 121. The software applications for managing the platform (e.g., admin portal), generating personalized message/sentences, and for rendering and delivering the message to a prospect may be different applications. Alternatively or additionally, the client application may comprise different interfaces/modes for a user to modify a prospect input data, to select, reject or edit output sentences, to manage the AI engine or handcrafted rules, respectively.

In some cases, the client software (i.e., software applications installed on the user devices 101-1, 101-2, 101-3) may be available either as downloadable software or mobile applications for various types of computer devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

In some cases, the provided platform may generate one or more graphical user interfaces (GUIs). The GUIs may be rendered on a display screen on a user device 101-1, 101-2, 101-3. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices, smart phones, personal digital assistants (PDAs), and tablets).

User devices may be associated with one or more users. In some embodiments, a user may be associated with a unique user device. Alternatively, a user may be associated with a plurality of user devices. A user may be registered with the platform. In some cases, for a registered user, user profile data may be stored in a database (e.g., database 123) along with a user ID uniquely associated with the user. The user profile data may include, for example, user names, user ID, identity, business field, contact information, historical data, and various others as described elsewhere herein.

A server 120 may access and execute the system 121 to perform one or more processes consistent with the disclosed embodiments. In certain configurations, the system may be software stored in memory accessible by a server (e.g., in memory local to the server or remote memory accessible over a communication link, such as the network). Thus, in certain aspects, the system(s) may be implemented as one or more computers, as software stored on a memory device accessible by the server, or a combination thereof.

In some embodiments, one or more systems or components of the present disclosure are implemented as a containerized application (e.g., application container or service containers). The application container provides tooling for applications and batch processing such as web servers with Python or Ruby, JVMs, or Hadoop or HPC tooling. The various functions performed by the user terminal and/or the system such as inputting prospect data, accepting/rejecting sentences, generating ruleset for further modifying AI predictions, customization results, model manage system for training a predictive model, executing a trained model, updating and retraining a model and the like may be implemented in software, hardware, firmware, embedded hardware, standalone hardware, application specific-hardware, or any combination of these. The system, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, graphics processing unit (GPU), coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

The third-party meeting system 130 can be any existing communication platform that provides tools for facilitating various tasks related to communication, social networking and the like. For example, the third-party system may provide software applications to assist scheduling meetings, and various features provided by the system such as determining logistics (e.g., when, where), identifying who should attend a meeting, and developing an agenda, meeting blueprints or another such document to guide the flow and/or discussion of the meeting may be integrated into the applications running on the third-party meeting system 130. In some cases, the third-party meeting system may be in direct communication with the system 121 such that the customized messages, personalized meeting schedules/blueprints and the like may be integrated into the third-party application such as via an API. Alternatively or additionally, the third-party system 130 can be any entities or social media sources that provide media content, services, social media stream, online resources, public or private resources, and the like that is to be scrapped and searched by the system for gathering prospect data. For example, the third-party system 130 may be in communication with the system 121 via APIs (e.g., Twitter API, NewsAPI, etc.) such that the third-party content library, service information, and various other availability information can be accessed by the system 121.

In some cases, the server 120 may also be configured to store, search, retrieve, and/or analyze data and information stored in one or more of the databases. The data and information may include prospect data as well as predicted data, personalized content (e.g., message, sentences), user data, ruleset associated with personalizing content, data about a predictive model (e.g., parameters, model architecture, training dataset, performance metrics, threshold, etc.), data generated by a predictive model such as extracted insight (e.g., prospect personality tags, sentences, meeting schedule, blueprints, etc.), and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, 101-3 third-party system 130, server 120, system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary devices or networks. For instance, indirect communications may utilize a telecommunications network. Indirect communications may be performed with aid of one or more routers, communication towers, satellites, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

User device 101-1, 101-2, 101-3, third-party system 130, server 120, or system 121, may be connected or interconnected to one or more databases 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the prospect data, personalized content (e.g., message, sentences), user data, ruleset associated with personalizing content, data about a predictive model (e.g., parameters, model architecture, training dataset, performance metrics, threshold, etc.), data generated by a predictive model such as extracted insight (e.g., prospect personality tags, sentences, meeting schedule, blueprints, etc.), and the like. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the system 121 may provide customized algorithms to extract, transform, and load (ETL) the data. In some embodiments, the system 121 may construct the databases using proprietary database architecture or data structures to provide an efficient database model that is adapted to large scale databases, is easily scalable, is efficient in query and data retrieval, or has reduced memory requirements in comparison to using other data structures.

In some embodiments, the one or more database systems 123, 111, which may be configured for storing or retrieving relevant data. Relevant data may comprise prospect data as well as predicted data, personalized content (e.g., message, sentences), user data, ruleset associated with personalizing content, data about a predictive model (e.g., parameters, model architecture, training dataset, performance metrics, threshold, etc.), data generated by a predictive model such as extracted insight (e.g., prospect personality tags, sentences, meeting schedule, blueprints, etc.), and various other data as described elsewhere herein. In some cases, the system 121 may source data or otherwise communicate (e.g., via the one or more networks 110) with one or more external systems or data sources 111, third party system 130, such as media sources, analytics services, enterprise management system, customer management services or databases. In some instances, the system 121 may retrieve data from the database systems 111, 123 which are in communication with the one or more external systems (e.g., external media assets, etc.) or third-party systems 130 (e.g., social media entity, third-party business entities, enterprise management software, customer management platforms, etc.).

In some cases, the database may store data related to machine learning-based models. For example, the database may store data about a trained model (e.g., parameters, hyper-parameters, model architecture, performance metrics, threshold, rules, etc.), data generated by a model (e.g., intermediary results, output of a model, latent features, input and output of a component of the model system, etc.), training datasets (e.g., labeled data, custom datasets, insight provided by admin/user, etc.), rulesets, algorithms, and the like. The database can store algorithms or ruleset utilized by one or more methods disclosed herein. For instance, user-defined ruleset to be used in combination with machine learning trained models for customizing a model prediction, selecting input text data, parsing texts or sentences may be stored in the database. In certain embodiments, one or more of the databases may be co-located with the server, may be co-located with one another on the network, or may be located separately from other devices. One of ordinary skills will recognize that the disclosed embodiments are not limited to the configuration and/or arrangement of the database (s).

In some cases, data stored in the databases or external databases can be utilized or accessed by a variety of applications through application programming interfaces (APIs). Access to the database may be authorized at per API level, per data level (e.g., type of data), per application level or according to other authorization policies.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Various aspects of the present disclosure may be applied to any of the particular applications set forth below or for any other types of applications or systems. Systems or methods of the present disclosure may be employed in a standalone manner, or as part of a package. The system may also allow for an easy and flexible integration of the various personalization features into any existing third-party website or platforms. For instance, the system may provide a plurality of options such as raw application programming interface (API), Plugins, Google Tag Manager and the like for integrating the AI-based outputs (e.g., sentences, meeting proposals/schedules, personality predictions, etc.) to a third-party platform. For example, the system may create various API endpoints for rendering frontend elements and code injection. One or more features (e.g., AI engine, opener generator, meeting scheduling engine, etc.) of the system may be integrated to a third-party application (e.g., Email application, calendar application, video conferencing application, messaging application, etc.). For instance, the system may include a family of plugins, extensions, modules and scripts that facilitate development and integration of the AI-based content, messages and services into third-party platforms. As an example, the system may comprise a preview extension to an Email application allowing users to preview customized email or messages. The preview extension provides the ability to enable a user to select, reject or edit the system generated sentences.

Figure 2:
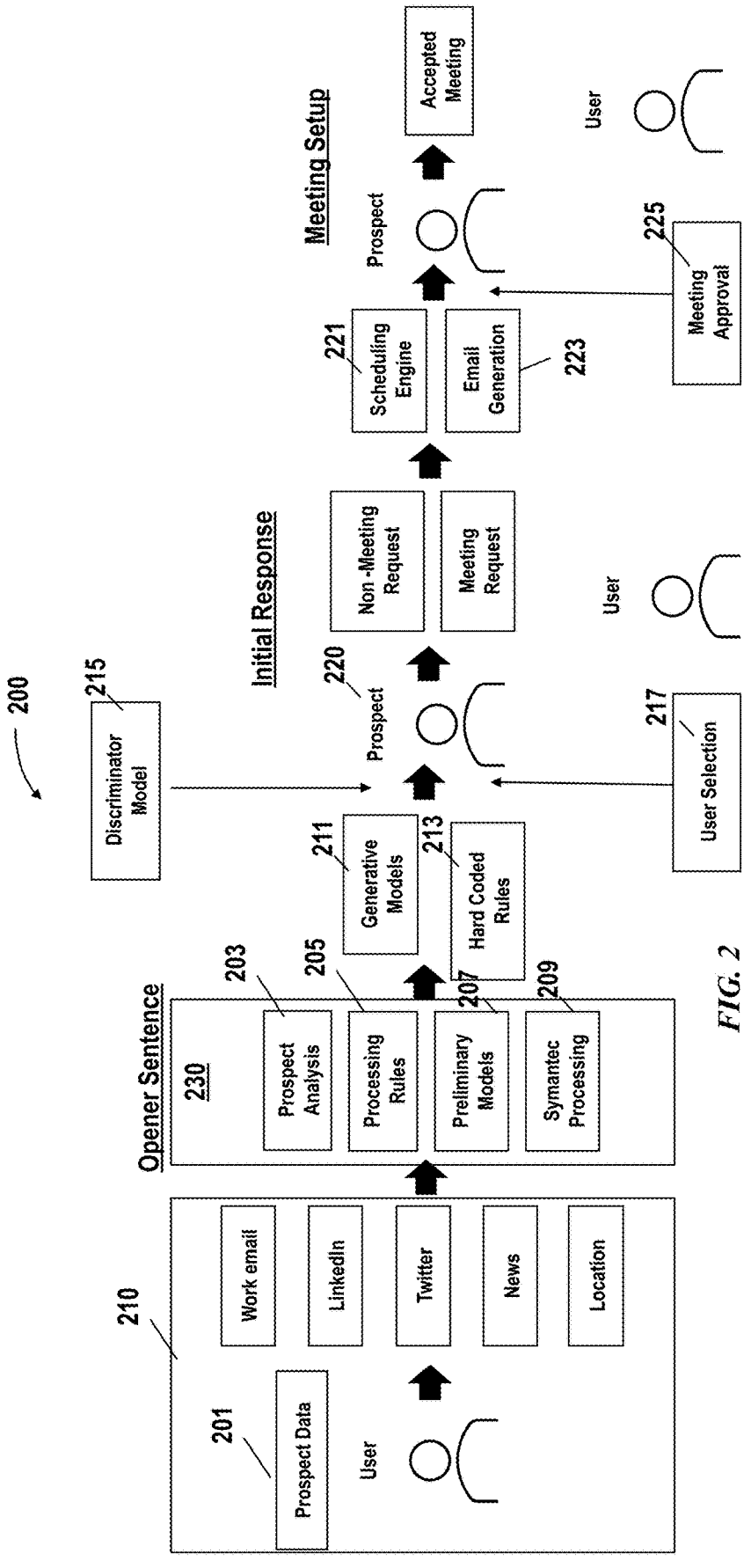
FIG. 2 shows an exemplary process of generating personalized email or opener sentence to a prospect.

FIG. 2 shows an exemplary process 200 of generating personalized email or opener sentences to a prospect. The process 200 may be performed by a plurality functional component of the system 121 described in FIG. 1 to output an opener sentence(s) for initiating a message/email to a prospect. In some embodiments, the process may begin with receiving prospect data 201. In some cases, the prospect data may comprise user input data related to a prospect or prospects 220 (e.g., prospective client, prospective employer, etc.). The user inputted prospect data may comprise, for example, data related to identity of a prospective entity or individual such as name, and personal data such as address, contact, social media associated with a prospect. The system may allow the user to provide the prospect data in a variety of means. For example, a user may load the data via a CSV (Comma Separated Values) file including one or more fields ['First Name', 'Last Name', 'Company Name', 'Email', 'Location' and 'LinkedIn Profile Link']. The user input data may or may not be structured data and the one or more of the generation models may be trained to process both structured data and unstructured data.

In some embodiments, the system may comprise a data input module 210 configured to receive the user input prospect data. In some cases, the data input module may comprise or be in communication with a frontend component such as a user interface module (GUI) for receiving the user input.

Figure 13:
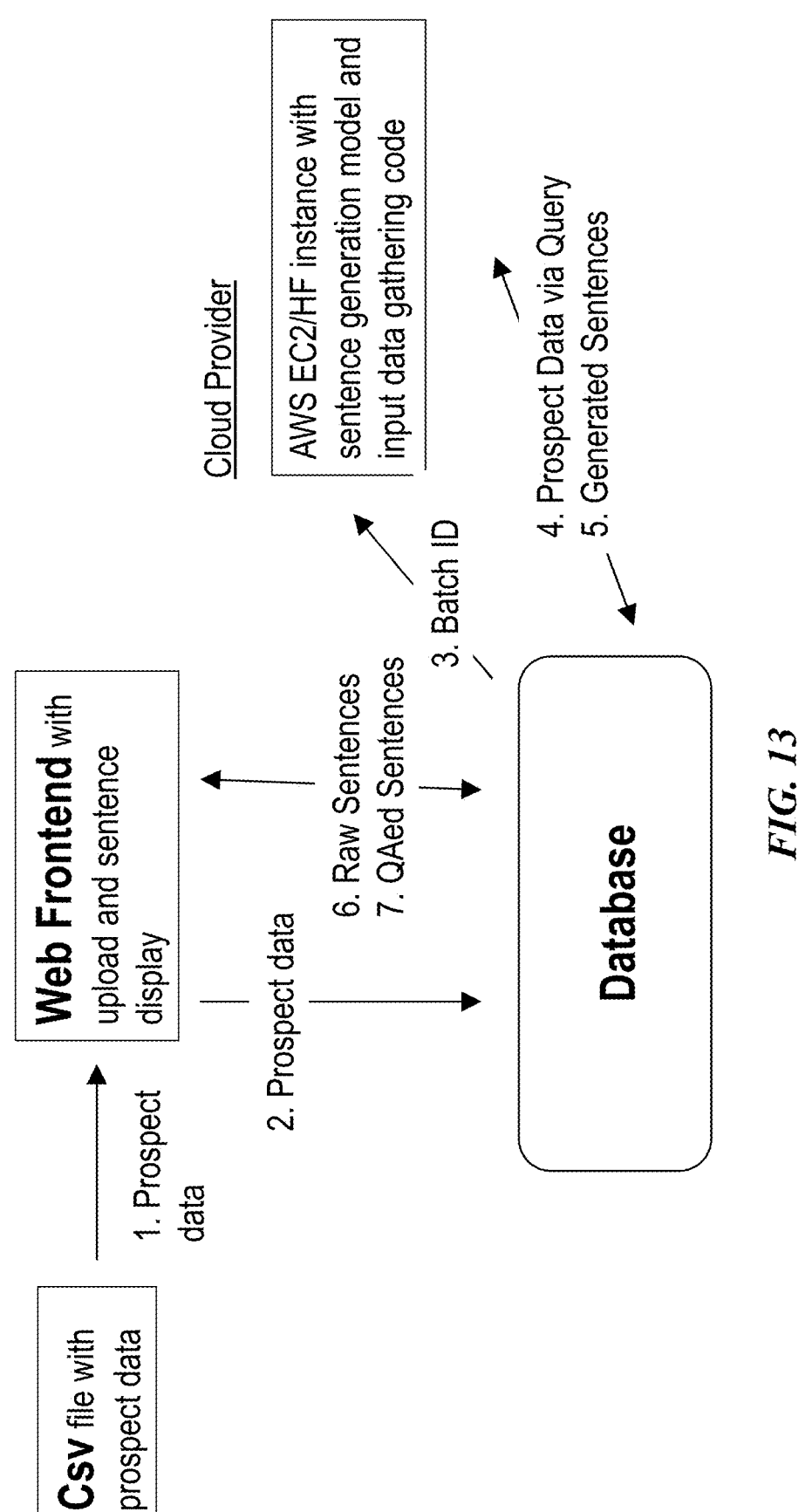
FIG. 13 shows an example of uploading prospect data via a frontend.

FIG. 13 shows an example of uploading prospect data via a frontend. The user interface module 205 may provide a user portal allowing users to provide prospect data, view system generated sentences, select, edit or reject sentences, modify rulesets and access other features related to various aspects of the system. The user portal may allow users to provide prospect data. Alternatively, the prospect data may be received by the system with minimum user input. As shown in the example, the frontend may include a web frontend.

In some cases, the user portal or client portal may further comprise a ruleset engine for creating, and/or modifying handcrafted rules. The one or more rulesets may be specified or defined to further customize an AI-based output (e.g., defining parsers to gate certain content), limit the predictions based on the rules or defining input text selection algorithm.

As shown in FIG. 13, the system or at least part of the system may be implemented on a cloud platform (e.g., including a server or serverless) that is in communication with one or more user systems/devices via a network. The cloud platform system may be configured to provide the aforementioned functionalities to the users (e.g., instance with sentence generation model and input data gathering code, etc.) via one or more user interface or graphical user interfaces (GUIs), which may include, without limitation, web-based GUIs, client-side GUIs, or any other GUI as described above.

For example, the frontend of the system may be implemented as a web application using a framework (e.g., Django Python) hosted on an Elastic Cloud Compute (EC2) instance on Amazon Web Services (AWS). In some cases, the backend of the system may be implemented as serverless compute service such as hosted on AWS Lambda as a serverless compute service running a web framework for developing RESTful APIs (e.g., FastAPI). This may beneficially allow for a large scale implementation of the system. For instance, the backend system (e.g., AWS Lambda) may partition a separate (e.g., 10 GB RAM) compute service for each independent opener creation process, allowing for a large number of concurrent processes. In addition, the backend of the system may integrate with various machine learning APIs for scalable fine-tuned model inference. For example, the backend of the system may integrate with plug-and-play inference APIs (e.g., huggingface, openapi, etc.) which make API calls to retrieve instance of fine-tuned models (e.g., developed and stored in a Transformers library) and make inferences. In some cases, a user may be permitted to specify the level of creativity or randomness of the model inference. Upon receiving a user inputted creativity level, the model's "confidence" in its predictions may be adjusted, with a higher creativity level resulting in more diverse and unexpected text and a lower creativity level resulting in more conservative and predictable text.

Figure 14:
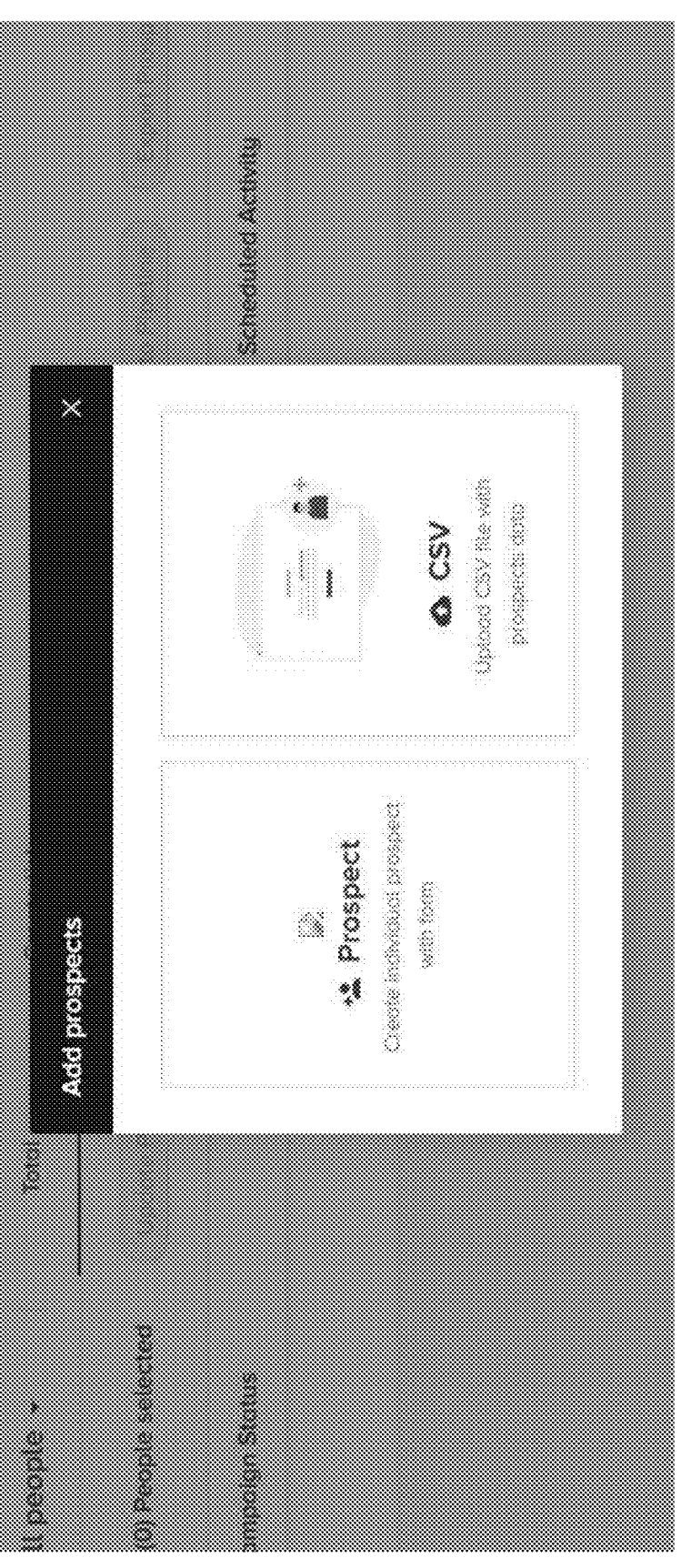
FIGS. 14-16 show various examples of a graphical user interface (GUI) for uploading or providing prospect data.
Figure 15:
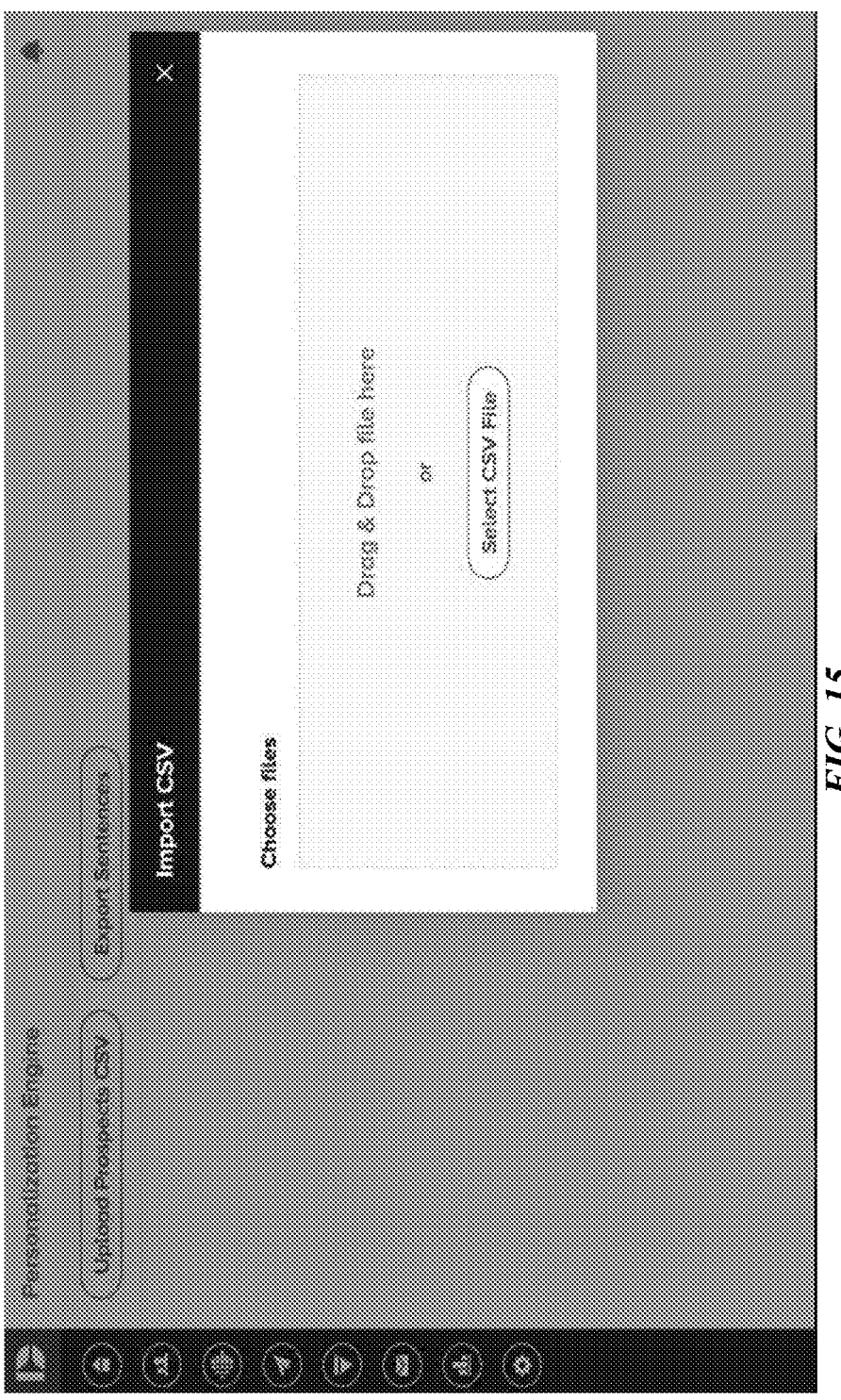
Figure 16:

FIGS. 14-16 show various examples of a graphical user interface (GUI) for uploading or providing prospect data. The GUI may allow a user to provide the prospect data in a variety of forms such as by uploading a file. As shown in FIG. 14, The file can be in any format that is suitable for exchanging text data. For example, a user may upload a CSV (Comma Separated Values) file which contains rows and columns. Each column may have a heading and relate to a given field about a prospect (e.g., ['First Name', 'Last Name', 'Company Name', 'Email', 'Location' and 'LinkedIn Profile Link']), and each row entry may include the required data/value for the corresponding field. Upon uploading the text file, the system may extract the values for the corresponding prospect data field. Alternatively or additionally, the GUI such as illustrated in FIG. 16, may allow the user to provide the prospect data such as via a text field (e.g., direct text input) in a form, provide a URL link to a prospect's social media source then the system may automatically extract the prospect information. In some cases, the user inputted prospect data may comprise the purpose of the message. For instance, the user may indicate the message/email is an "opener."

Referring back to FIG. 2, in some cases, the prospect data may comprise non-textual data (e.g., images). The data input module 210 may comprise an optical character recognition (OCR) system using a trained model to produce the output of data fields by processing the image data. For instance, the OCR system may comprise a machine learning algorithm trained model to accurately localize text lines in a natural image. An output of the model may comprise text lines recognized from the image data. In some cases, the model may be a deep learning network trained to detect a text line in a sequence of fine-scale text proposals directly in convolutional feature maps. An end-to-end trained model of the OCR system may be capable of detecting texts of any language or scale without further post-processing. The OCR system may provide accurate localization and recognition of texts from an image without knowing the format of the text fields and location in the image. In some cases, the user inputted prospect data may be prior communication history or interaction with the prospect. For example, the prospect may be people who have been emailed together without direct exchanging of emails or messages in the past.

In some embodiments, the data input module may also comprise a suite of scrapping and searching tools for gathering a variety types of prospect data. For instance, the data input module 210 may comprise data scrapers or API plugins to create various API endpoints for extracting prospect information (e.g., Twitter, NewsAPI, etc.). For example, calling the API may require a specific header to authorize the call. As shown in FIG. 2, in some embodiments, the prospect data may further comprise data obtained using a suite of scrapping and searching techniques. For example, upon a user providing the prospect data, a suite of data scraping and searching procedures on stored and online data (e.g., work Email, LinkedIn, Twitter, News, location history, etc.) may be triggered based on the user provided prospect data. For example, upon a user providing input indicating name of a prospective individual, or target organization, entity or a purpose of the networking, a suite of scrapping and searching tools may be triggered to obtain information such as the individual's company, biography, hobby, and the like utilizing any suitable resources (e.g., social media, public resources, ontology databases, etc.).

In some embodiments, the gathered prospect data may be further processed by an input data processing component 230 of the system. For instance, the input data processing component 230 may comprise a set of processing rules 205, preliminary models (including social media profiling) 207, prospect analysis engine 203 and semantic processing component 209 to process the scrapped and stored data for refinement. For instance, the semantic processing component 209 or the prospect analysis engine 203 may employ any suitable NLP techniques such as a parser to perform parsing on the input text. A parser may include instructions for syntactically, semantically, and lexically analyzing the text content of the input data and identifying relationships between text fragments. The parser makes use of syntactic and morphological information about individual words found in the dictionary or "lexicon" or derived through morphological processing (organized in the lexical analysis stage). In an example, the input data analysis process may comprise multiple stages including, creating items, segmentation, lexing and parsing. In some cases, the input data processing component may perform sentiment analysis on the input data which utilizes a trained model to identify and extract opinions.

In some cases, the prospect analysis engine 203 and/or the processing rules 205 may utilize any suitable resources (e.g., public resources, ontology databases, etc.) to determine a confidence level of the extracted information. For example, the prospect analysis engine may determine if the extracted company name is legitimate by verifying the information against publicly available resources (e.g., Wikipedia). The prospect analysis engine may determine the confidence level by aggregating relevant data pulled from all the available sources and assess the confidence level of the extracted prospect information.

In some cases, the input data processing module 230 may output refined prospect data such as input data (e.g., vector) to be fed to a sentence generation model. For example, the input data may be converted from the refined prospect data comprising the user inputted prospect data, a subset of the scraped input text. The input data may be fed to a sentence generation model such as a generative model 211 and processed by a group of hard coded processing rules 213 for producing one or more sentences, a message or an Email.

In some cases, the generated sentences may be rated by a discriminator model 215 for auto-filtering. The discriminator models 215 may be logic-based filters for filtering any unacceptable output. For example, the discriminator model may receive sentence output from the sentence generation model and may determine whether the sentences are acceptable or unacceptable. In some cases, a rejection from the discriminator model may trigger another sentence/message generation process with updated input data. The updated input data may comprise a different subset of the prospect data selected based on an input text selection algorithm. In some cases, the discriminator model may be a trained transformer model which is described with respect to FIG. 4.

Figure 17:
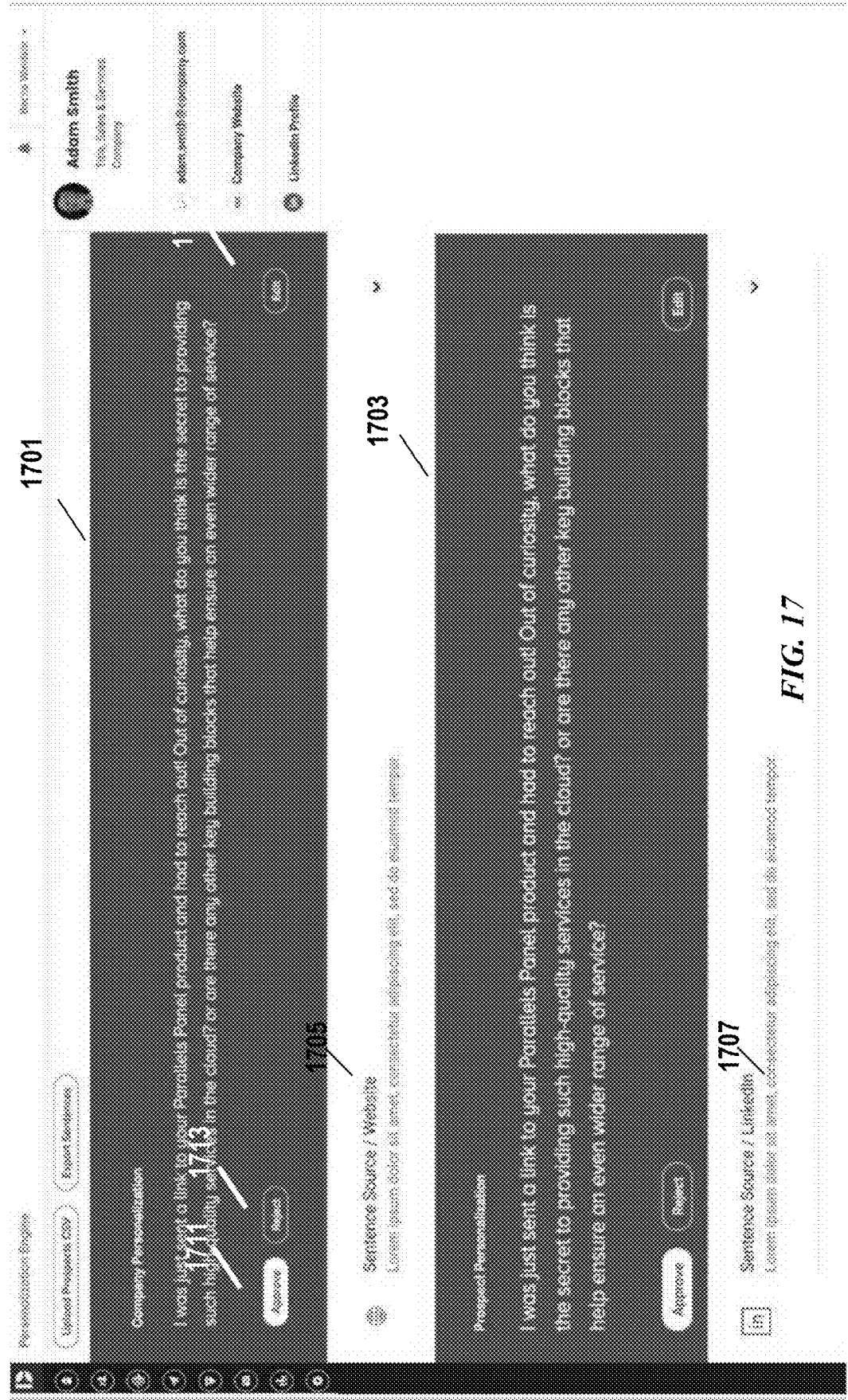
FIG. 17 and FIG. 18 show examples of a GUI displaying a set of generated sentences.
Figure 18:
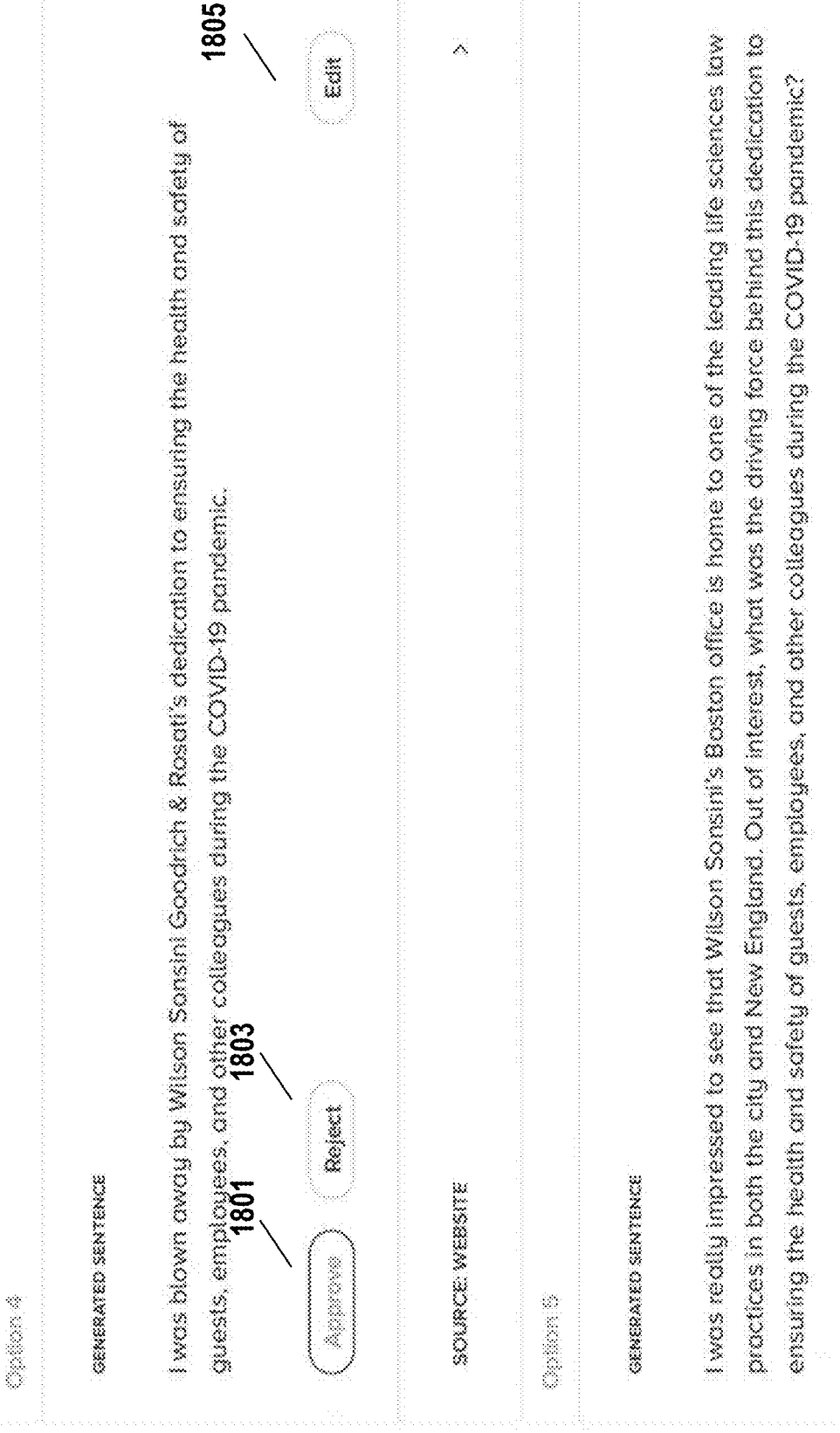

In some embodiments, a set of output sentences may pass the discriminator model and be presented to the user for selection 217. FIG. 17 and FIG. 18 show examples of a GUI displaying a set of generated sentences. A user may be permitted to rejection, accept, or edit any selected sentence from the set of generated sentences. As shown in the example of FIG. 17, a plurality of emails or opener messages 1701, 1703 are generated and presented on the GUI. The plurality of emails may or may not be generated using the same sources of prospect data. In the illustrated example, the two opener messages 1701, 1703 are generated based on different sources 1705, 1707. In some cases, the plurality of generated opener messages displayed within the GUI may be personalized with different targets. For example, the two opener messages 1701, 1703 are company personalization and prospect personalization. Alternatively, the plurality of opener messages may be personalized for the same targets (as shown in FIG. 18). A user may be permitted to 'approve' or 'reject' the proposed message or sentences, or edit the sentence/email by clicking on the graphical elements such as the approve button 1711, 1801, reject button 1713, 1803 or the edit button 1715, 1805. The user portal may comprise editor features that allow users to edit the sentence(s). The user's selection, approval, rejection or edits may be utilized to further train or refine the sentence generation model 211 and/or the discriminator model 215.

In some cases, a rejection of a machine generated sentence may trigger a new sentence generation process. For example, upon receiving a user input (e.g., clicking on the reject button 1803), the list of remaining sentences displayed to the user may be updated and/or reordered. A rejection of a machine generated sentence may also trigger a new sentence generation process in the backend. For example, upon receiving a user input indicating rejection of a generated sentence, a new sentence generation cycle may be triggered by selecting a new subset of input prospect data (e.g., different prospect source, different target, etc.) and generating new sentences.

In some cases, the sentence generation cycle may be repeated without user input. For example, upon the discriminator model 215 determining the sentences are below an acceptable threshold, a new subset of input prospect data may be selected and one or more new sentences may be generated. In some cases, the process may be repeated multiple times until a satisfactory sentence or message is generated. In some cases, the acceptance threshold may be determined based on the application. For instance, the threshold may be adjusted per the application of the tool. The threshold may consist of a number between 0 and 1 which has been passed through a Log Transform algorithm. In some cases, depending on the application of the generated output, human approval may be required instead of or in addition to the acceptance threshold.

Figure 3:
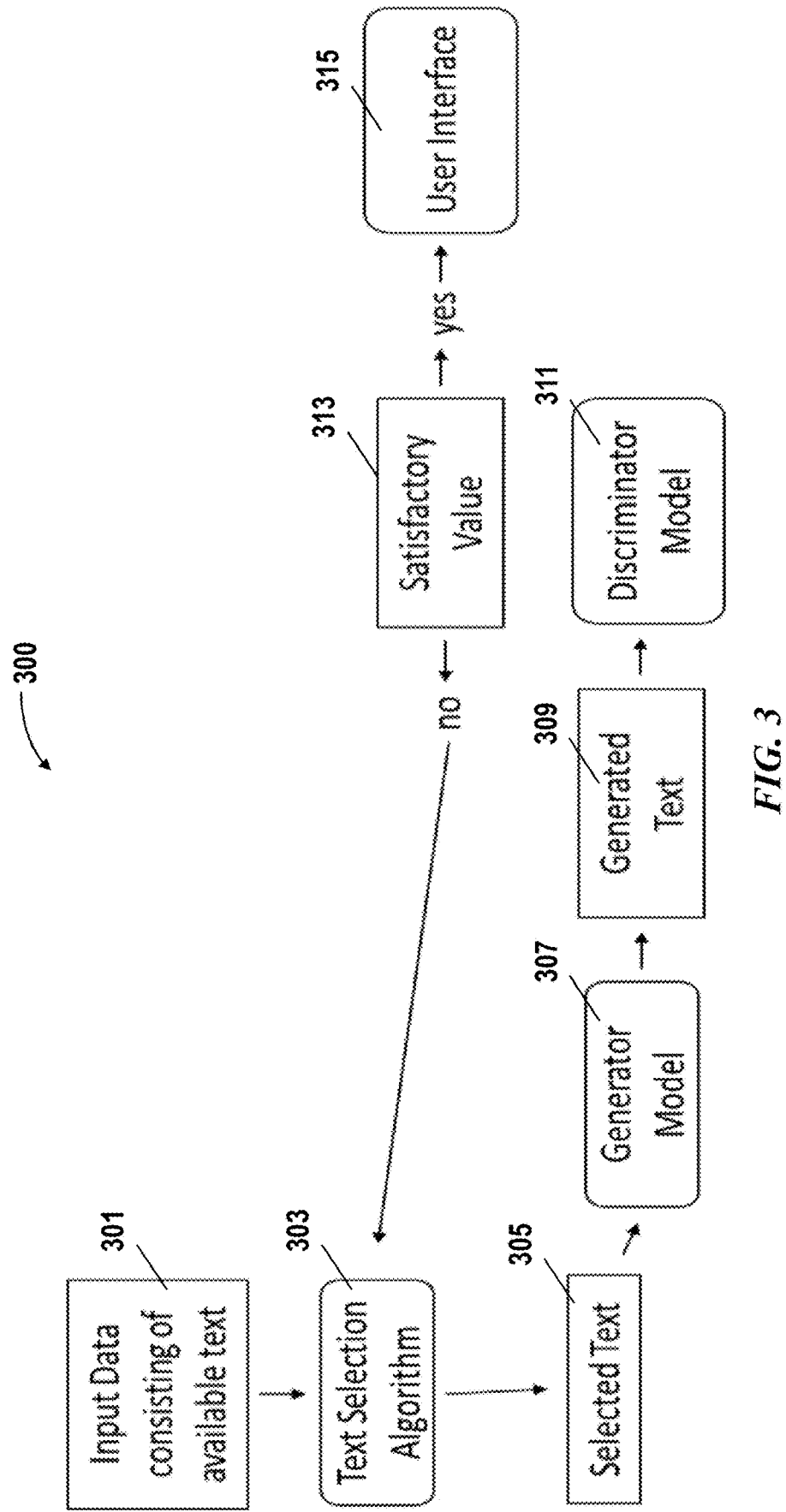
FIG. 3 schematically illustrates an exemplary process of repeating the sentence generation processes.

FIG. 3 schematically illustrates an exemplary process 300 of repeating the sentence generation cycle based on a satisfactory value 313. As described above, the satisfactory value 313 may be based on a system determined acceptance threshold. For example, a score generated by the discriminator model 311 may be compared against the acceptance threshold to determine whether the satisfactory value is "no" or "yes." Alternatively or additionally, the satisfactory value 313 may be based on a user input (e.g., user input indicating rejection of a generated sentence, edit of a sentence, etc.). When the satisfactory value is indicative of "not satisfied" (e.g., "no") or is below the acceptance threshold, a new subset of input prospect data 305 may be selected from the input data 301 and one or more new sentences may be generated. In some cases, the process may be repeated multiple times until a satisfactory sentence or message is generated and displayed to a user interface 315.

In some cases, a subset of the scraped input text 305 may be selected by a text selection algorithm 303 and fed to the generator model 307. The generator model 307 can be the same as the sentence generator model or generative model (fine-tuned personal generative model) as described elsewhere herein. The text selection algorithm 303 may comprise lists of keywords which sort and gate the input text. In some cases, the text selection algorithm may be a trained model such as a trained transformer model. For example, the text selection algorithm may be developed utilizing a training dataset. The training datasets may be created utilizing data from websites (e.g., over 1,000 websites). For example, the training dataset may comprise Scraped html data parsed by field experts (e.g., website scraping is done in python using the requests and Python library for pulling data out of HTML and XML files). The training dataset may also comprise user inputs or user feedback collected via the system herein to further fine-tune the text selection model (e.g., transformer model). For example, a pre-trained text selection model may be further fine-tuned or personalized using user provided input (e.g., rejection of a generated sentence, edits to a generated sentence).

The sentence generator model 307 may produce "opener" sentence(s) 309 which is fed into the discriminator model 311. The discriminator model 311 can be the same as the discriminator model 215 or the sentence discriminator model 415 as described elsewhere herein. If the output value of the discriminator model is acceptable (e.g., the score is greater than the acceptance threshold) then the generated text may be displayed on the GUI 315. If the discriminator output score is below the acceptance threshold, a next subset of text 305 may be selected by the text selection algorithm 303 and fed into the generator model then the process is repeated.

In some cases, the sentence generation model and the discriminator model may be continuously trained based on the newly collected user input including the approved and rejected sentences and/or user edits to the sentences. In some embodiments, the user approved sentences may be combined with the input text to feed the generator. For example, the rejected and accepted sentences may be combined along with the labels (e.g., approved, rejected) to 'feed' the discriminator and further improve or fine-tune the discriminator model parameters. This beneficially reduces the amount of training dataset required for training the models.

Referring back to FIG. 2, the user selected sentence may then be sent to the prospect 220 via a user selected communication channel (e.g., Email). A response from the prospect may be sent to semantic models for analysis and content mining. For instance, scheduling information from the response may be mined (e.g., words indicating meeting, call, time, location, etc.) and then fed into a scheduling engine 221. The content processing and semantic models may include word and content filters that may protect the user from sending unwanted sentences/emails and may include grammar filters to process the generated emails/messages.

The scheduling engine 221 may interface with the user's scheduling applications (e.g., calendar application) and any timing data mined from the response email and propose a meeting based on the extracted timing data and the user's calendar data. In some cases, information about the proposed meeting may be included in an email 223 generated by the sentence generator model and the user may be permitted to approve the meeting and/or update the email 225 then send the email/meeting invite to the prospect.

Figure 4:
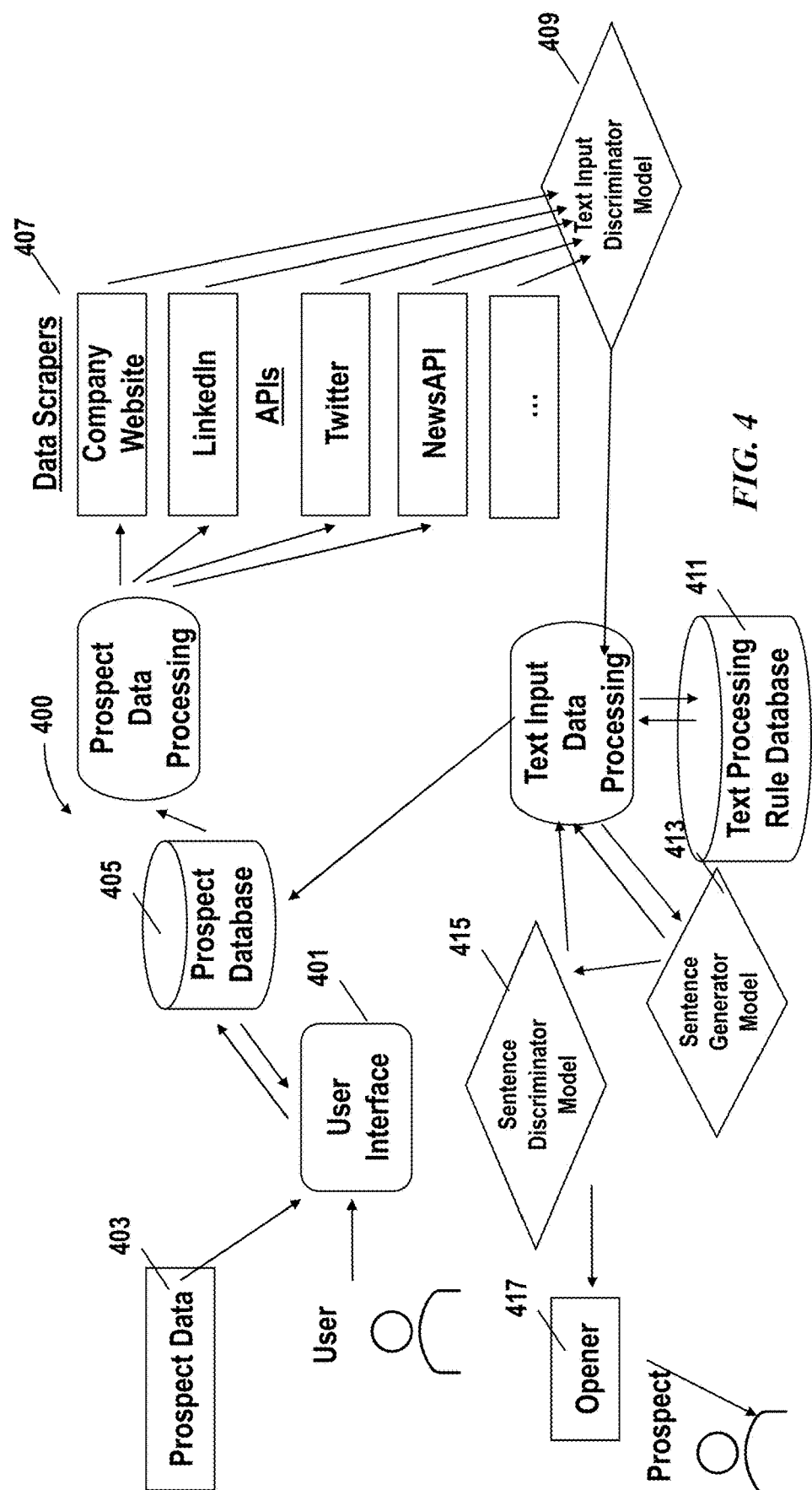
FIG. 4 shows an example of an opener sentence generation system.

FIG. 4 shows an example of an opener sentence generation system 400. The opening sentence generation may fully automate the process from identifying a prospect to system to generating an opening message to user approval of an opener message, email or sentence. The opener sentence generation system 400 may comprise a plurality of components same as those described in FIG. 2 and elsewhere herein. For example, a user may interact with a user interface

401 to provide prospect data 403. The prospect data may be stored in a prospect database 405. The user provided prospected data may also be used by data scrapers 407 to obtain additional prospect data from a variety of sources such as company website, LinkedIn, Twitter, NewsAPI and the like. In some cases, a data input module of the system (e.g., data input module 210) may comprise data scrapers 407 or API plugin of the data to create various API endpoints for extracting prospect information (e.g., Twitter, NewsAPI, etc.) as described above.

The assembled prospect data may be passed to the text input discriminator model 409 to generate text input data. In some cases, the text input discriminator model 409 may comprise a transformer model. The text input discriminator model 409 may be the same as the text selection algorithm or text selection model as described above. In some cases, a subset of the text input data may be selected based on text processing rules retrieved from the text processing rule database 411 and the subset of the text input data may be fed to the sentence generator model 413 to produce one or more sentences.

The sentence discriminator model 415 may determine whether the one or more sentences are accepted or rejected. The sentence discriminator model 415 may comprise a transformer model as described elsewhere herein. As described above, if the sentence is rejected either by a user or the sentence fails to pass the sentence discriminator model, the text processing rule may be utilized to select another subset of text input data and repeat the sentence generation process until the sentence meets the satisfactory value of the sentence discriminator model. The accepted sentence(s) may be presented to the user as candidate opener 417. The user may be allowed to select or reject a sentence via the GUI. The selected sentence may be sent to the prospect as the opener sentences 417.

In some embodiments, the data input module and input data processing module may be referred to as a single system such as text generation system. The text generation system may comprise a series of text processing logic, web scrapers and input APIs, and one or more trained language models. The text input logic and machine learning models may be updated continuously utilizing data gathered during usage or expert training data generation. The processing logic and web interface may reside on a series of cloud compute instances or local machines. The text generation system or the input data processing module may allow multiple instances with the same logic being created as needed to handle load. For example, the text generation system may create API endpoints such as inference endpoints by deploying a fine-tuned machine learning model (e.g., text selection model, sentence generator, discriminator model, etc.) on one or more GPU instances, hosted on AWS, or autoscaling in one or more containers, and then make inferences or generating model predictions using the API inference endpoint.

Figure 5:
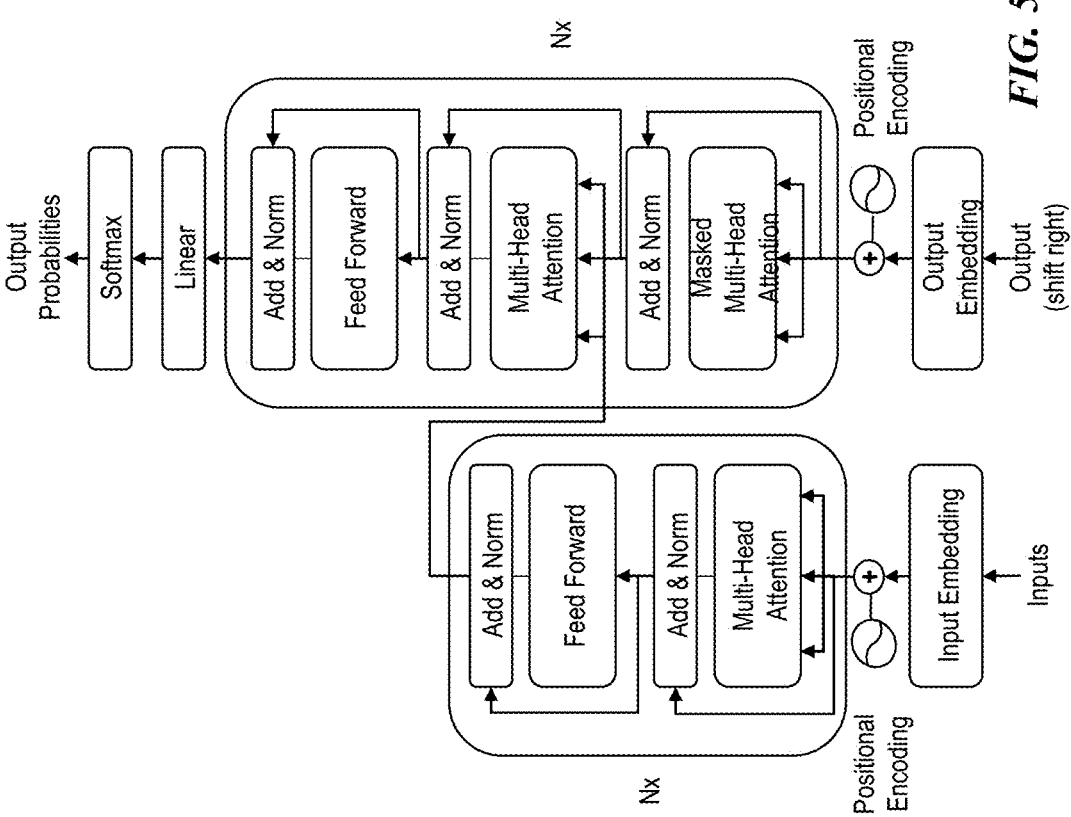
FIG. 5 shows an example of a transformer model employed for processing text data and generating sentences.

In some embodiments, the sentence generator, discriminator model, generative model and classification models may be transformer models. FIG. 5 shows an example of a transformer model for processing the text data and generating sentences. In some embodiments, the model network may comprise an autoencoder and a classifier system. During the feature extraction operation, the autoencoder may be used to learn a representation of the input data for dimensionality reduction or feature learning. The autoencoder can have any suitable architecture such as a classical neural network model (e.g., sparse autoencoder, denoising autoencoder, contractive autoencoder) or variational autoencoder (e.g., Generative Adversarial Networks).

As an example, the transformer model may a Bidirectional and Auto-Regressive Transformer (BART) which is a Transformer that combines the Bidirectional Encoder (i.e. BERT like) with an Autoregressive decoder (i.e. GPT like) into one Seq2Seq model. The Bidirectional Encoder Representations from Transformers (BERT) is a transformer language model with a variable number of encoder layers and self-attention heads. The BERT may be pre trained on two tasks: language modelling (e.g., tokens may be masked and BERT may be trained to predict them from context) and next sentence prediction (BERT may be trained to predict if a chosen next sentence was probable or not given the first sentence). As a result of the training process, BERT learns contextual embeddings for words. After pretraining, BERT can be finetuned with less resources on smaller datasets such as custom datasets to optimize its performance on specific tasks such as generating opener sentences.

In the illustrated example, the network may comprise a transformer model with a Multi-Head Attention mechanism to compute representations of its input and output without using sequence aligned RNNs or convolution. The model may use stacked self-attention and point-wise, fully connected layers for both the encoder and decoder. For example, the encoder may comprise a stack of N identical layers each with two sub-layers. The first sublayer is a multi-head self-attention mechanism, and the second sub-layer is a simple, position-wise fully connected feed-forward network. In some cases, a residual connection may be employed around each of the two sub-layers, followed by layer normalization. The decoder may comprise a stack of N identical layers. In addition to the two sub-layers in each encoder layer, the decoder may insert a third sub-layer, which performs multi-head attention over the output of the encoder stack. Similar to the encoder, residual connections are employed around each of the sub-layers, followed by layer normalization.

In some cases, the self-attention sub-layer in the decoder stack may be modified to prevent positions from attending to subsequent positions. The multi-head attention allows the model to jointly attend to information from different representation subspaces at different positions. An attention function may map a query and a set of key-value pairs to an output, where the query, keys, values, and output are all vectors. The output is computed as a weighted sum of the values, where the weight assigned to each value is computed by a compatibility function of the query with the corresponding key. The input consists of queries and keys of dimension $d_k$, and values of dimension $d_v$. The multi-head attention may linearly project the queries, keys and values h times with different, learned linear projections to $d_k$, $d_k$ and $d_v$ dimensions, respectively. On each of these projected versions of queries, keys and values the attention function is performed in parallel, yielding $d_v$-dimensional output values. These are concatenated and once again projected, resulting in the final values.

It should be noted that the example model architecture is for illustration purposes only, people skilled in the art would recognize that various other types of encoder-decoder models can be utilized. For instance, the model may comprise a sparse autoencoder with an RNN (recurrent neural network) architecture, such as LSTM (long-short-term memory) network, may be trained to regenerate the inputs. For example, an encoder-decoder LSTM model with encoder and decoder layers may be used to recreate a low-dimensional representation of the input data (i.e., low-dimensional features) to the following model training despite a latent/hidden layer. Once the unsupervised features (e.g., low-dimensional representation) are extracted, the extracted features may be used to train two or more classifiers, which accept the extracted features as inputs and map them to the appropriate class label.

In the illustrated example, the input tokens/output tokens may be converted to embeddings such as vectors of dimension $d_{model}$. A learned linear transformation and softmax function may be used to convert the decoder output to predicted next-token probabilities. In some cases, the model for extracting unsupervised features may be refined or tuned as new data is collected from the system.

Figure 6:
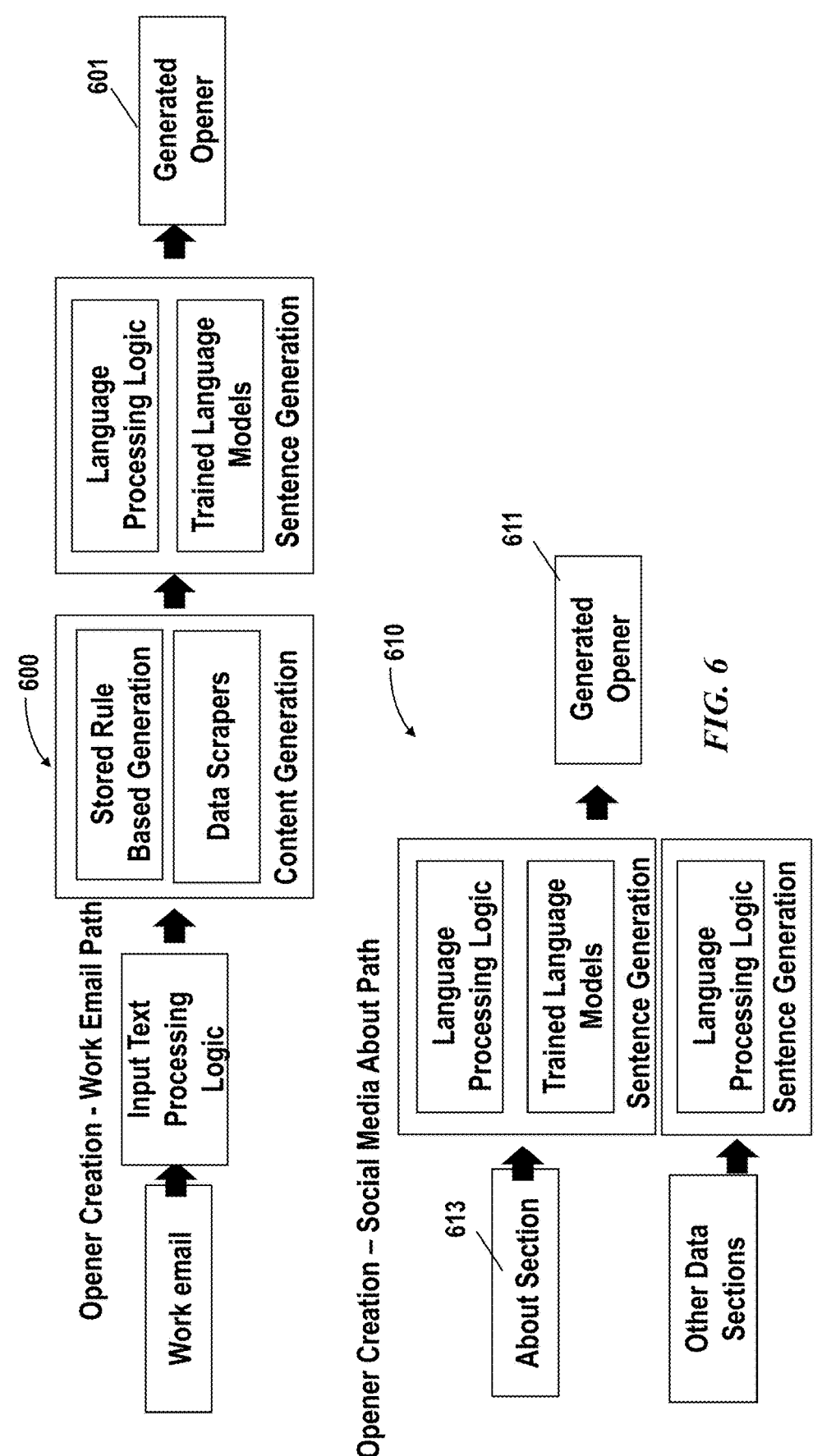
FIG. 6 and FIG. 7 show various examples of opener sentence creation processes.
Figure 7:
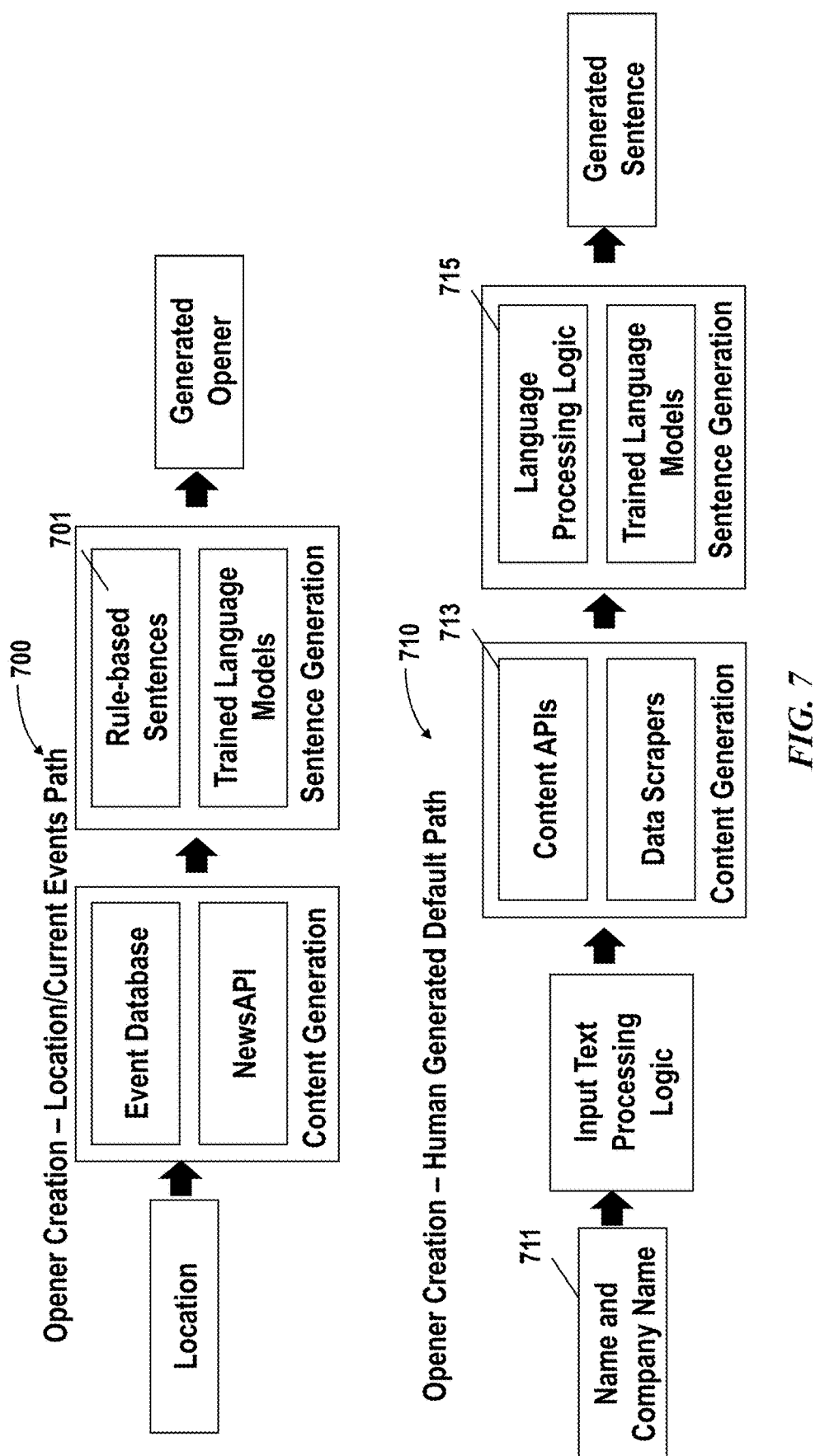

FIG. 6 and FIG. 7 show various examples of opener sentence creation. The examples as shown in FIG. 6 and FIG. 7 may illustrate the processes when different subset of input text data is selected for generating the opener sentence. For instance, one process may be selected from the plurality of different processes based on a user input indicating rejection a sentence generated by the system. For example, upon receiving a rejection of a sentence 601 generated based on a first subset of input texts containing input data from the Email via a first process 600, a second subset of input texts containing input data from social media source (other than Email) may be selected and the corresponding process/path 610 may be executed by the system to generate a new sentence 611.

In some cases, the plurality of data paths/processes 600, 610, 700, 710 may share one or more components such as language processing logic or trained language model. In some cases, the plurality of data paths/processes 600, 610, 700, 710 may be different in one or more components such as the rules for content generation, or rules for sentence generation. The plurality of data paths/processes 600, 610, 700, 710 can be executed sequentially, concurrently or in an order based on a predetermined text selection algorithm. Alternatively or additionally, the data paths or processes may be independent paths/processes that are executed based on the available input data. For example, one or more of the plurality of data paths or processes 600, 610, 700, 710 may be executed concurrently to generate a final output opener message depending on the source or type of the input data.

FIG. 6 shows an example 600 of creating opener sentence (s) via work email. The Work Email example shows that the system may receive a work email (e.g., from the user) as input data, the work email may be processed by the input text processing logic to obtain prospect data, the prospect data may then be passed to the content generation component to gather and generate additional prospect data or content (e.g., using data scrapers, stored rule-based generation). The assembled prospect data may be fed to sentence generation components including language processing logic and trained models for generating an opener sentence (e.g., email). The sentence generation component may comprise a sentence discriminator model as described elsewhere herein to determine whether the sentence is acceptable and the process may be repeated multiple times until a satisfactory sentence (opener sentence) is generated. In some cases, the output of the system i.e., generated opener sentence, may be in a format or suitable for a communication channel specified by the user and/or based on the input data (e.g., a user may specify the opener sentence is for an Email or text message).

When the input data comprises available social media data, the social media about process 610 may be executed. For example, the social media data may comprise the about section 613 of a prospect personal or company LinkedIn page or website in addition to all and other data sections on relevant publicly available information. The opener sentence may be generated using the components same as those described above. Alternatively or additionally, the opener sentence or message may be conforming to or suitable in the social media form such as same as the form of the input data (e.g., LinkedIn message) or in a user-specified form.

FIG. 7 shows an example 700 of receiving input data comprising a prospect's location data and generating an opener based on the location data. The location data may be used by the content generation component to gather data from the event database that is generated on a schedule from news feeds and previous queries. The location/current event path for generating opener sentence may comprise rules 701 for sentence generation. For example, the rules 701 may ensure that no controversial news stories make it into the opener (e.g., list of good words, list of bad words, entity lists, pre-written sentences attached to an entity, pre-written sentences attached to a sporting event, pre-written sentences attached to weather, etc.). In some cases, the rules 701 may be determined by a user, and may be updated manually to be conservative. For instance, political, crime-related, and other controversial words or topics may be filtered out before the time-consuming generative process.

The aforementioned examples may require little user input. For example, the social media, work email, or prospect location may be selected by a text selection algorithm as described above without user input. In some cases, when none of the aforementioned types of prospect data is available, or when the corresponding output opener does not pass a satisfactory threshold, the human generated process 710 may be triggered. For example, when the output opener does not yield a satisfactory result, a user may be prompted to provide prospect data such as first name and/or company name 711. Alternatively or additionally, a user may be prompted to confirm or edit the input data that is generated from previously machine generated text. The user provided input such as name of prospect or company name may be processed by the content generation component 713 and additional content may be collected via the content APIs or data scrapers. The additional content along with the user inputted information may then be fed to the sentence generation component 715 to generate an output sentence.

In some embodiments, the system herein may comprise sockets to integrate the variety of machine learning trained models and/or functional components. In some cases, the sentence generative model may be time-consuming and may be provided a socket to a GPU API. Other less-computationally expensive processes may be implemented as parallel CPU processing steps. A socket may provide a programming construct, an instance, or instantiate, that can make use of suitable protocol to send and receive data. For example, a socket may be Web Socket APIs allow bi-directional, full-duplex communication between clients and servers. It follows the exclusive pair communication model. This Communication API does not require a new connection to be set up for each message to be sent between clients and servers. Once the connection is set up the data can be sent and received continuously without any interruption. Sockets such as WebSocket APIs are suitable for Applications with low latency or high throughput requirements.

Figure 8:
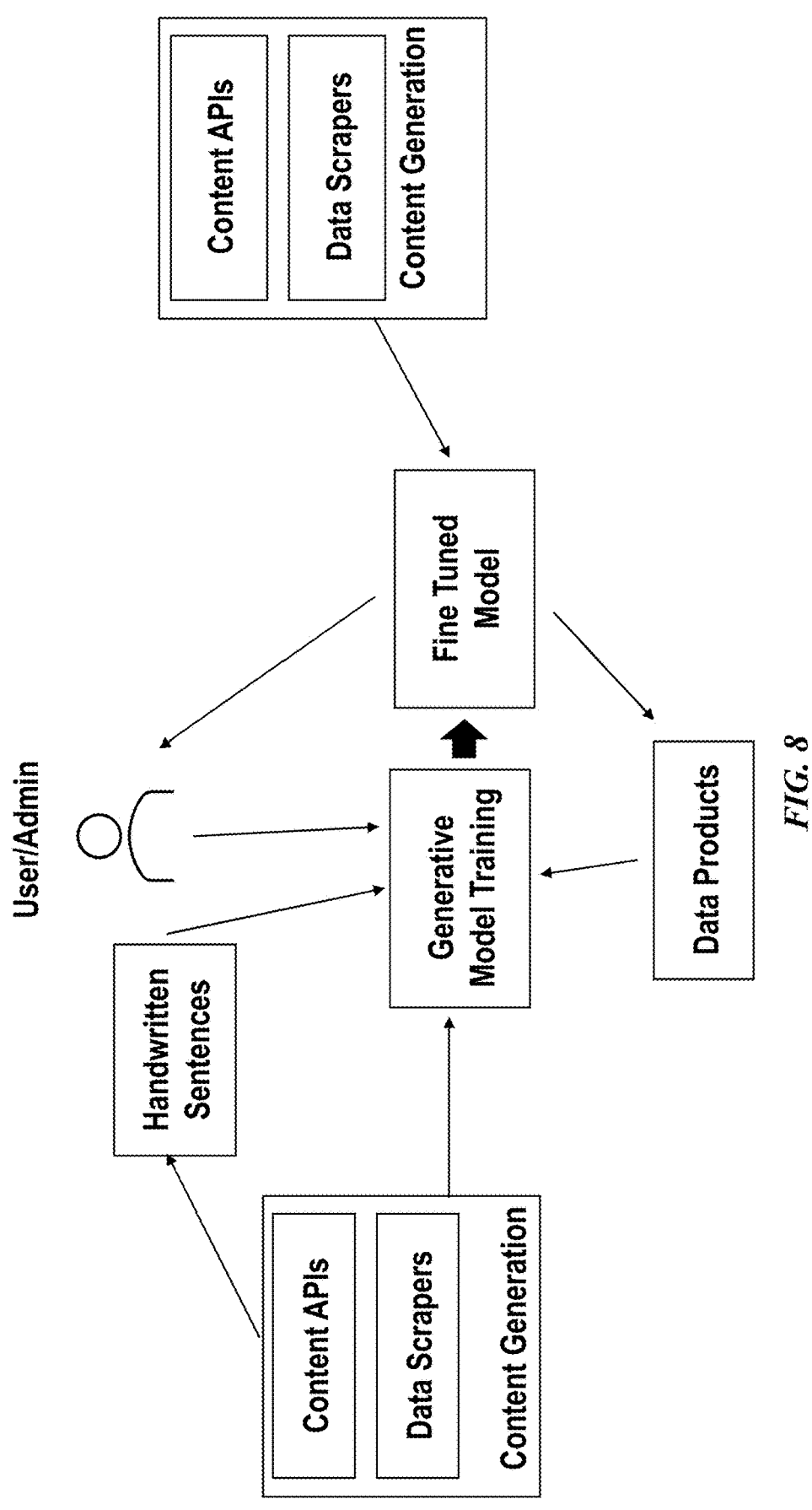
FIG. 8 illustrates an exemplary processing for training generative models.

FIG. 8 illustrates an exemplary processing for training generative models. The generative text models may be updated with minimal changes to the code. In an example, a database of over 1,000 examples i.e., training dataset may be used to train or fine-tune the generative attention-based model. For training data may be custom data comprising sentences generated by a user. For example, the user or admin may feed the model by writing sentences or modifying content generated by the content generation component. Alternatively or additionally, the training data may comprise sentences labeled by a labeling system. For instance, a user or admin may be provided with sentences and label them as acceptable or unacceptable via a user interface of the labeling system.

Figure 9:
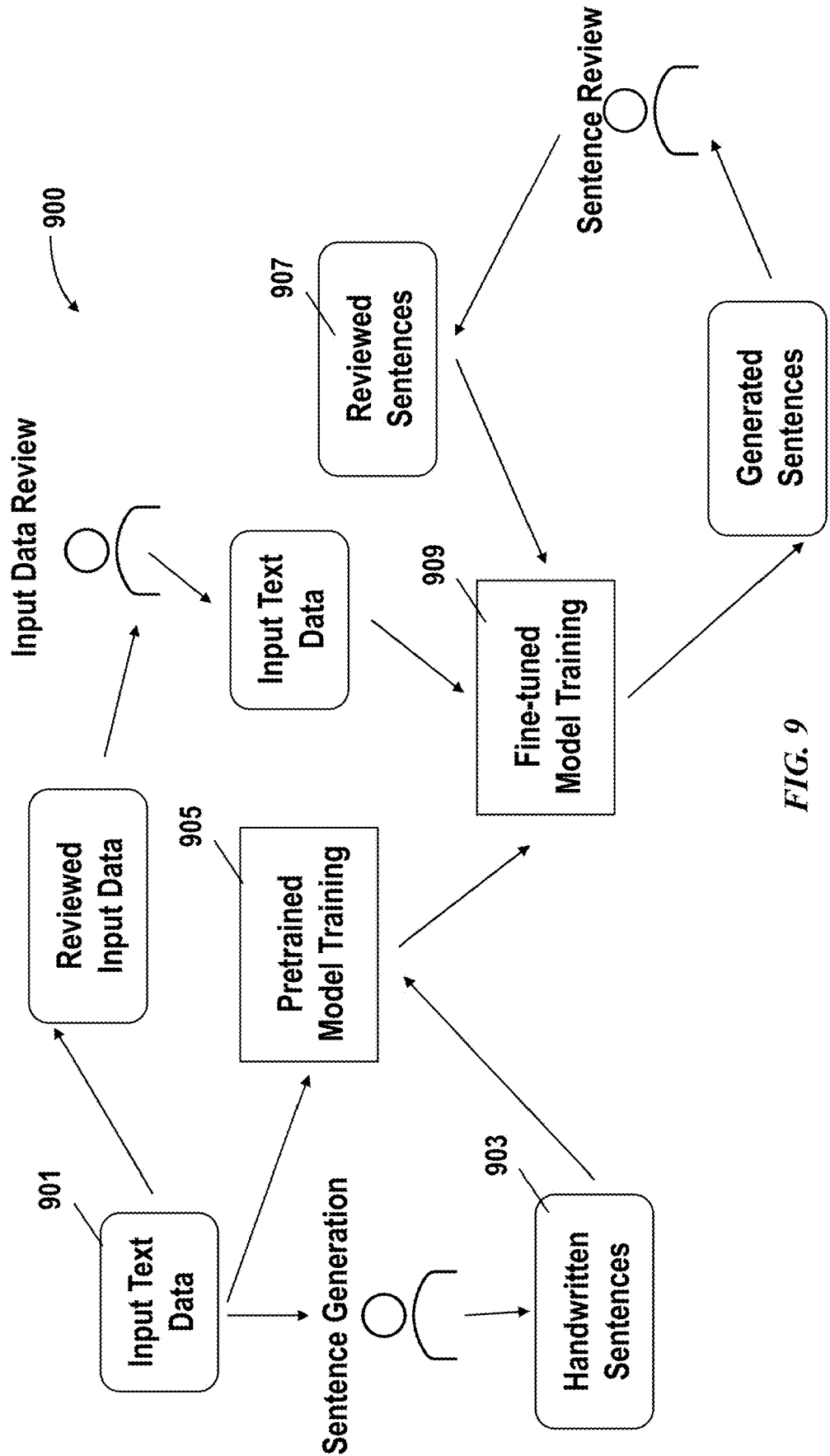
FIG. 9 shows an example of a process for developing generative and categorical models.

FIG. 9 shows an example of a process 900 for developing generative and categorical models (classifiers). In some cases, the models of the system may be broken into one or more categories (e.g., preliminary model, initial sentence review model, categorical model, content rating model, etc.). Each model may be trained with respective training datasets. The process 900 may comprise fine-tuning pre-trained models to create a model personalized to a user or a group of users.

In the illustrated example, a set of sentences (e.g., 100, 200, 300 or more sentences) may be converted or mapped to the text input data 901. These sentences may also be used to train the preliminary model e.g., pretrained model (e.g., BERT model or GPT-based model) 905. The preliminary model 905 may be used to create a set of sentences 907 which may be curated by a user or admin. The curated and human generated sentences 907 may be used to train the initial sentence review model 909 used to filter out unacceptable sentences. These curated and human generated sentences may be automatically fed back into the model 909 to continue fine-tuning the model. By fine-tuning the model parameters with user provided feedback or human generated sentences, the model 909 is personalized to the user. The scrapped input data may also be utilized to train a categorical model. The categorical model may also be referred to as content rating model which may be trained to identify rich text from the scrapped and gathered content from a variety of sources (e.g., social media, work Email, news, location, etc.). The system may also comprise a classification model to identify personality traits or tags of the prospect. For example, the classification model may be a multi-label classification model that is trained to assign zero, one or more labels or tags to a prospect.

As described above, models utilized by the system herein may be fine-tuned models trained using private data. Private data or user provided input data may be utilized as training dataset to fine-tune pretrained models (e.g., BERT or GPT-based models). For instance, the fine-tuning process of a pre-trained Transformer model may comprise obtaining private data, and pre-processing the private data to create private training dataset. For example, private data may comprise uploaded prospect data via the APIs interfacing, user provided feedback data such as rejection of a generated sentence or edits to a generated sentence as described elsewhere herein. In some cases, the private data or custom data for fine-tuning the pretrained model may be automatically labeled as different categories that correspond to different hierarchy or levels for accessing the private data. For example, the different categories may correspond to sources or owners of data such as individual data, team data, project data, organization data and the like. The different categories may be based on different permissions for accessing the private information. For example, if a user is part of a project or team, that is part of a department, and part of the organization, a fine-tuned model accessible to the user may be trained on data that is produced at the project level, the department level, and the organization level.

In some cases, the platform or system herein may be configured to permit only the owner of a fine-tuned model to upload, modify, delete the private dataset, access or update the fine-tuned model. In some cases, the platform may be configured to permit the owner to grant read-only access to the fine-tuned model (e.g., can use the model for inference but cannot modify or fine-tune the model) for one or more other non-owner parties. Alternatively, an owner may grant right to other users to use the fine-tuned model to build their own model or fine-tune the model using their own private data. The system herein may allow owner of a private datasets and fine-tuned model to share the private training data or personalized model via an API endpoint for other users to access the private data or personalized models.

The fine-tuning of the model may be conducted in a cloud platform. For example, the backend of the system may integrate with API endpoints (e.g., huggingface, openapi, etc.) to fine-tune pre-trained models using private data and make inferences using inference API endpoint as described above. As an example, the fine-tuning of a pretrained model such as BERT model may be performed on huggingface cloud and fine-tuning of a pretrained model such as a GPT-based model may be performed on the openai platform. The training process may be performed remotely using organization tokens by multiple domain experts. Systems herein may integrate with the training platforms via scaled inference structures which allow for concurrency and rapid development. Alternatively, model inference can also be made from hosted or on premises services such as using Django-based APIs.

In some embodiments, the system herein (e.g., system 121 in FIG. 1) may comprise a model management system for training, developing, managing a set of models described herein. In some cases, one or more machine learning-based models may be trained and developed for various purposes/goals as described elsewhere herein. The model management system may be provided for model creation and model management. In some cases, the model management system may include a model monitor system that monitors data drift or performance of a model in different phases (e.g., development, deployment, prediction, validation, etc.). The model monitor system may also perform data integrity checks for models that have been deployed in a development, test, or production environment. The model monitor system may be configured to perform data/model integrity checks and detect data drift and accuracy degradation. The process may begin with detecting data drift in training data and prediction data. During training and prediction or detection, the model monitor system may monitor difference in distributions of training data, test, validation and prediction or detection data, change in distributions of training data, test, validation and prediction or detection data over time, covariates that are causing changes in the prediction output, and various others.

Figure 10:
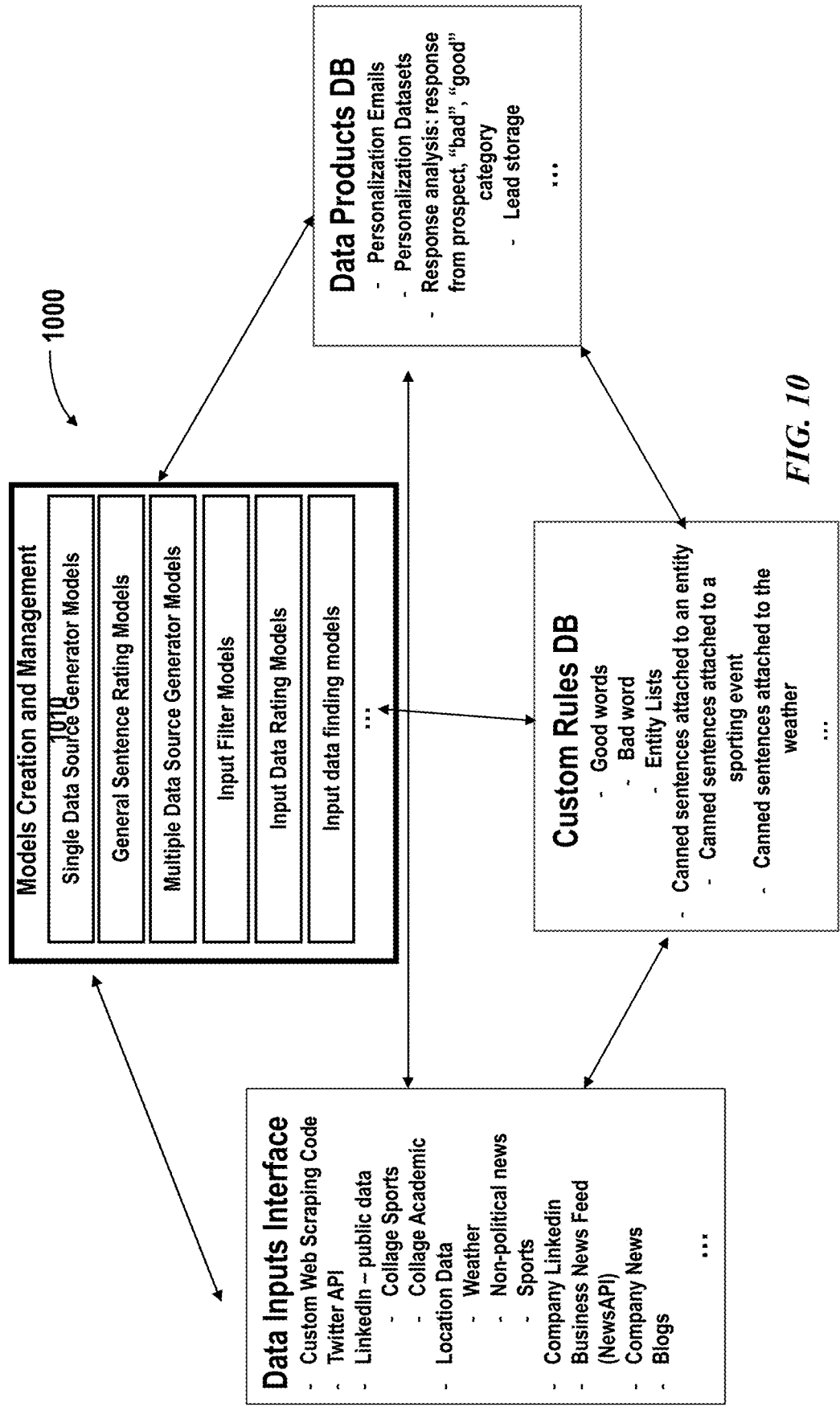
FIG. 10 schematically illustrates a system comprising a plurality of components for implementing algorithms and methods herein.

FIG. 10 schematically illustrates a system 1000 comprising a plurality of components. The system can be the same as the system as described elsewhere herein. In some embodiments, the system may comprise a backend system running on the cloud. The backend system may include a predictive model management system configured to train and develop predictive models as described elsewhere herein (e.g., single data source generator model, general sentence rating model, multiple data source generator model, input filter model, input data rating model, input data finding model, etc.). The backend system may also make inferences using the trained model to generate customized sentences/messages. FIG. 10 illustrates an example of a model management system 1010. In some cases, the trained predictive models may be deployed and updated through a model update module of the model management system. The model update module may monitor the performance of the trained after deployment and may retrain a model if the performance drops below a predetermined threshold. In some cases, the model management system may also support continual training of one or more models upon new user input data. In some cases, the model management system may comprise model monitor system that monitors data drift or performance of a model in different phases (e.g., development, deployment, prediction, validation, etc.). The model monitor system may also perform data integrity checks for models that have been deployed in a development, and test. The model monitor system may be configured to perform data/model integrity checks and detect data drift and accuracy degradation. The process may begin with detecting data drift in training data and prediction data. During training and prediction or detection, the model monitor system may monitor difference in distributions of training data, test, validation and prediction or detection data, change in distributions of training data, test, validation and prediction or detection data over time, covariates that are causing changes in the prediction output, and various others. Data monitored by the model monitor system may include data involved in model training and during production. The data at model training may comprise, for example, training, test and validation data, predictions, detections, or statistics that characterize the above datasets (e.g., mean, variance and higher order moments of the data sets). Data involved in production time may comprise time, input data, predictions made, and confidence bounds of predictions made. In some embodiments, the ground truth data may also be monitored. The ground truth data may be monitored to evaluate the accuracy of a model and/or trigger retraining of the model. The model monitor system may monitor changes in data such as changes in ground truth data, or when new training data or prediction data becomes available.

The trained or updated models may be stored in a model database managed by the models management system 1010. The model database may contain pre-trained or previously trained models (e.g., DNNs, transformer, etc.). Models stored in the model database may be monitored by the model monitor system as described above and continually trained or retrained after deployment.

The model creation and management system 1010 may be coupled to one or more databases such as a custom rules database and data products database. As illustrated in the example, the custom rules database may store custom rules for generating sentences. The rules may be related to, for example, good words, bad words, entity lists, canned sentences attached to an entity, canned sentences attached to an event (e.g., sporting event), canned sentences attached to weather and various other custom rules. The data products database may store output generated by the models developed and maintained by the system 1010. For example, the output may include, but not limited to, personalization emails, personalization datasets, response analysis result such as response from a prospect categorized to bad response or good response category, lead storage and the like. The model creation and management system 1010 may also be coupled to the data inputs interface to obtain the data for creating training data for fine-tuning the models.

Figure 11:
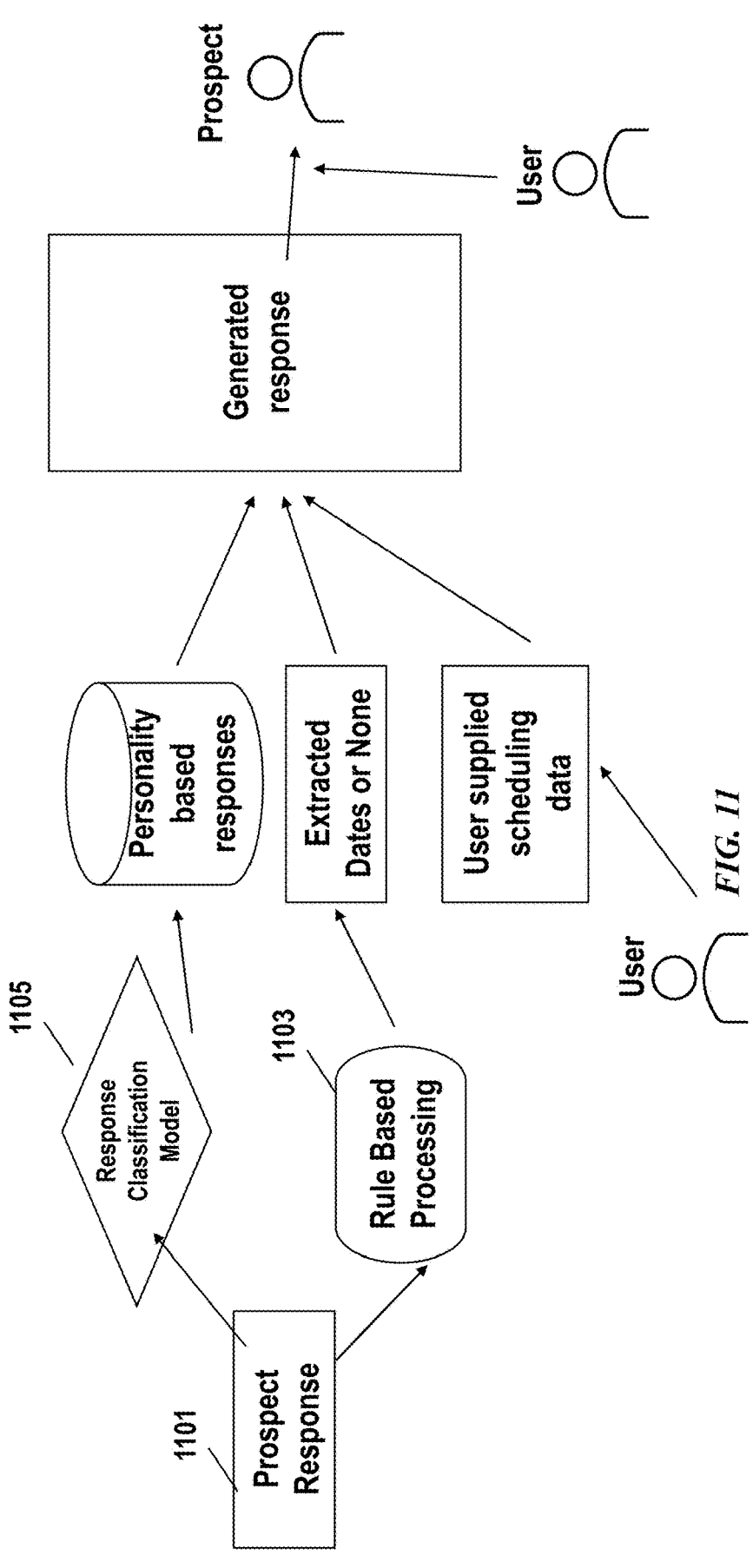
FIG. 11 shows an example of a scheduling engine utilized for creating emails or messages with meeting information.

In some embodiments, the platform may further comprise a scheduling engine as part of an automated pipeline. FIG. 11 shows an example of a scheduling engine utilized for creating emails or messages with meeting information. In some cases, the system may receive a response from a prospect 1101. The prospect response 1101 may be an email or a message that may or may not contain scheduling information. The prospect response 1101 may be processed by the rule-based processing component 1103 and/or response classification model 1105 to extract scheduling data. For example, scheduling data may be extracted using a series of rule-based algorithms 1103 and fine-tuned attention-based models 1105. In some cases, the extracted scheduling data 1109 may be combined with personality-traits or personality tags 1107 extracted by the personality analysis engine along with any scheduling constraints 1111 provided by the user to create a response 1113. The personality types or tags may be based on the prospect's response. For example, a longer response likely indicates a 'social' person whereas a concise response may indicate a busy 'boss' person. The response 113 may comprise a proposed meeting time which is approved by the user, then sent to the prospect. The proposed meeting time and/or the content of the response may be determined based at least in part on the personality types or tags predicted by the personality analysis engine.

Figure 12:
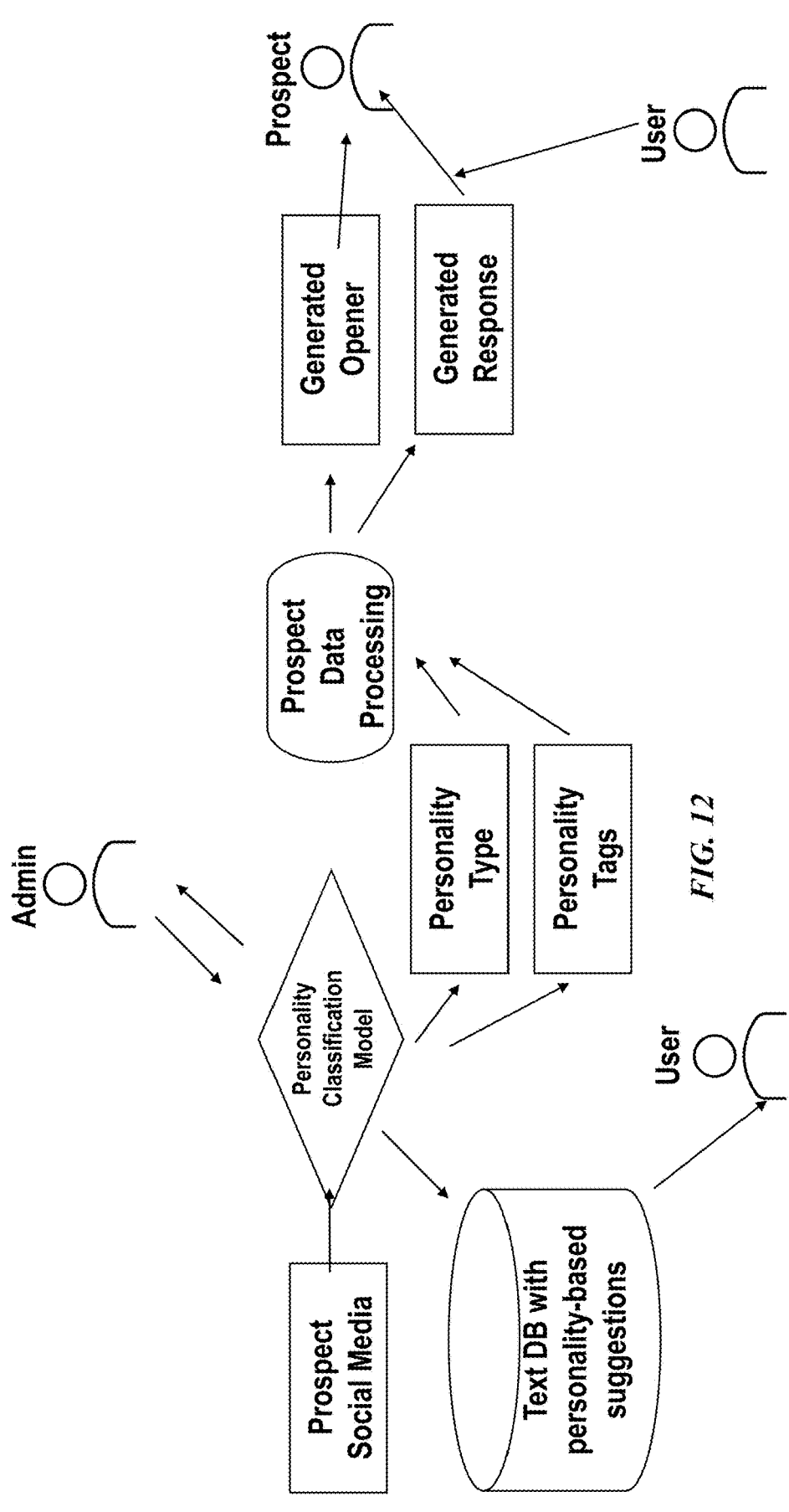
FIG. 12 shows an example of a Personality Analysis Engine.

In some embodiments, the platform may comprise a personality analysis engine. FIG. 12 shows an example of a Personality Analysis Engine. In some cases, the personality analysis engine may comprise a transformer-based personality analysis model. The personality analysis model may be trained to predict an overall personality type and/or personality tags. The personality type and/or personality tags may be used to provide concise insights to the user in form of pre-generated written text responses from the database and as input into the opener and response generators. In some cases, the training for the personality analysis model may utilize a Myers-Briggs Personality Type Data set from the public domain. The personality analysis model may utilize any suitable psychological trait taxonomy to assess human personality. For instance, an important trait taxonomy in academic psychology is the "Big Five", also known as the Five-Factor Model, which provides an objective and standardized framework for assessing human personality in terms of five core traits: Openness, Conscientiousness, Extroversion, Agreeableness and Neuroticism (the "OCEAN" traits). Big Five testing and other truly-psychological trait taxonomies have been the subject of rigorous scientific research, which has objectively demonstrated such models to be a useful predictor of human behavior, and preferences. As an example, each prospect may comprise five dimensions in "trait space", each containing a score in respect of one of the OCEAN personality traits. However, as noted, various other personality trait taxonomies can be used to assign the personality type and/or personality tags such as within the social networking context.

The responses may be reviewed, expanded and fine tuned. In some cases, the personality analysis model may continue to be trained utilizing human review/updates of inference which can be fed back into the model.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for generating customized opener sentences, the system comprising:

a data input module configured to receive prospect data, wherein the prospect data comprises data related to a prospect and data obtained from a plurality of sources;

an input data processing module configured to select a first subset of the prospect data to create an input data;

a first model trained to generate one or more opener sentences based on the input data; and a second model trained to determine whether the one or more opener sentences are unacceptable, wherein upon determining the one or more opener sentences are unacceptable, directing the input data processing module to select a second subset of the prospect data to create a new input data.

2. The system of claim 1, wherein the data related to the prospect is received via a graphical user interface (GUI) of the system.

3. The system of claim 2, wherein the plurality of sources is determined based at least in part on the data received via the GUI.

4. The system of claim 1, wherein another subset of the prospect data is selected until the one or more opener sentences are acceptable.

5. The system of claim 1, wherein the input data processing module comprises a text selection model trained to select the first subset of the prospect data and the second subset of the prospect data.

6. The system of claim 5, wherein the text selection model is trained by fine-tuning a pre-trained transformer model using a user feedback data.

7. The system of claim 6, wherein the user feedback data comprises a user input indicative a rejection of an opener sentence among the one or more opener sentences or an edit to an opener sentence among the one or more opener sentences.

8. The system of claim 1, wherein the first model or the second model is trained by fine-tuning a pre-trained transformer model using private data.

9. The system of claim 8, wherein the private data comprises user feedback data received in response to the one or more opener sentences and human curated sentences.

10. The system of claim 1, wherein the first subset of the prospect data and the second subset of the prospect data are from different sources from the plurality of sources.

11. The system of claim 10, wherein when the second subset of the prospect data is selected, a processing path corresponding to the source of the second subset of the prospect data is selected for generating one or more new opener sentences.

12. The system of claim 11, wherein the processing path corresponding to the source of the first subset of the prospect data and the processing path corresponding to the source of the second subset of the prospect data are different in at least a pre-determined rule for generating the one or more opener sentences.

13. The system of claim 1, further comprising a third model trained to process a response received from the prospect in response to a message comprising the one or more opener sentences and generate an analysis result.

14. The system of claim 13, wherein the analysis result comprises extracted meeting information or personality tag of the prospect.

15. The system of claim 14, wherein the analysis result is used to generate a response handling messaging comprising a meeting time, wherein the meeting time is determined based at least in part on availability information obtained from one or more sources referencing availability of a user and the personality tag of the prospect.

\*  \*  \*  \*  \*